(12) United States Patent
Xiong et al.

(10) Patent No.: US 12,363,665 B2
(45) Date of Patent: Jul. 15, 2025

(54) METHOD AND DEVICE FOR DETERMINING TIMING INFORMATION

(71) Applicant: Samsung Electronics Co., Ltd., Suwon-si (KR)

(72) Inventors: Qi Xiong, Beijing (CN); Feifei Sun, Beijing (CN); Min Wu, Beijing (CN); Yi Wang, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 274 days.

(21) Appl. No.: 18/005,422

(22) PCT Filed: Jul. 13, 2021

(86) PCT No.: PCT/KR2021/008938
§ 371 (c)(1),
(2) Date: Jan. 13, 2023

(87) PCT Pub. No.: WO2022/015004
PCT Pub. Date: Jan. 20, 2022

(65) Prior Publication Data
US 2023/0262633 A1    Aug. 17, 2023

(30) Foreign Application Priority Data

Jul. 13, 2020 (CN) ......................... 202010668970.4
Oct. 14, 2020 (CN) ......................... 202011099478.6
(Continued)

(51) Int. Cl.
*H04W 56/00* (2009.01)

(52) U.S. Cl.
CPC .......................... *H04W 56/0045* (2013.01)

(58) Field of Classification Search
CPC .............. H04W 56/0045; H04W 64/00; H04B 7/18513
See application file for complete search history.

(56) References Cited

U.S. PATENT DOCUMENTS

| 10,938,546 B2 | 3/2021 | Xie et al. |
| 2014/0348122 A1* | 11/2014 | Li .......................... H04W 72/04 370/330 |

(Continued)

FOREIGN PATENT DOCUMENTS

| CN | 109842932 A | 6/2019 |
| EP | 3512288 A1 | 7/2019 |

(Continued)

OTHER PUBLICATIONS

Supplementary European Search Report dated Jul. 16, 2024, in connection with European Application No. 21841676.6, 13 pages.
(Continued)

*Primary Examiner* — Ashley Shivers

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure provides a method and device for determining timing information.

15 Claims, 26 Drawing Sheets

(30) Foreign Application Priority Data

Jan. 15, 2021 (CN) .......................... 202110055996.6
May 17, 2021 (CN) .......................... 202110535031.7

(56) References Cited

U.S. PATENT DOCUMENTS

| | | |
|---|---|---|
| 2015/0181366 A1 | 6/2015 | Chae et al. |
| 2015/0256429 A1 | 9/2015 | Yoshizawa |
| 2017/0164310 A1 | 6/2017 | Jeong et al. |
| 2017/0331577 A1 | 11/2017 | Parkvall et al. |
| 2018/0027555 A1 | 1/2018 | Kim et al. |
| 2019/0349877 A1 | 11/2019 | Alasti et al. |
| 2020/0028768 A1 | 1/2020 | Sadiq et al. |
| 2020/0100298 A1* | 3/2020 | Pan ..................... H04W 56/001 |
| 2020/0275492 A1* | 8/2020 | Lei ..................... H04W 74/0808 |
| 2021/0029658 A1* | 1/2021 | Mahalingam ..... H04W 56/0005 |
| 2021/0153158 A1* | 5/2021 | Agarwal ........... H04W 74/0833 |
| 2022/0124658 A1* | 4/2022 | Beale ................... H04W 24/10 |
| 2022/0330347 A1* | 10/2022 | You ................... H04B 7/18513 |
| 2023/0164719 A1* | 5/2023 | Yuan .................. H04W 56/004 |
| | | 370/503 |

FOREIGN PATENT DOCUMENTS

| | | |
|---|---|---|
| WO | 2016184015 A1 | 11/2016 |
| WO | 2019097855 A1 | 5/2019 |
| WO | 2020126945 A1 | 6/2020 |

OTHER PUBLICATIONS

3GPP TS 25.331 V7.1.0 (Jun. 2006), Technical Specification, 3rd Generation Partnership Project; Technical Specification Group Radio Access Network; Radio Resource Control (RRC); Protocol Specification (Release 7), Jun. 2006, 103 pages.

Nokia, et al., "Updates to synchronization solution #11.2," S2-1904715 (revision of S2-1903864), SA WG2 Meeting #132, Xi-an, China, Apr. 8-12, 2019, 8 pages.

International Search Report and Written Opinion of the International Searching Authority dated Oct. 19, 2021, in connection with International Application No. PCT/KR2021/008938, 8 pages.

First Office Action dated May 29, 2025 in connection with CN Application No. 202110535031.7 19 pages.

* cited by examiner

METHOD AND DEVICE FOR DETERMINING TIMING INFORMATION

CROSS-REFERENCE TO RELATED APPLICATIONS

This application is a 371 National Stage of International Application No. PCT/KR2021/008938, filed Jul. 13, 2021, which claims priority to Chinese Patent Application No. 202010668970.4, filed Jul. 13, 2020, Chinese Patent Application No. 202011099478.6, filed Oct. 14, 2020, Chinese Patent Application No. 202110055996.6, filed Jan. 15, 2021, and Chinese Patent Application No. 202110535031.7, filed May 17, 2021, the disclosures of which are herein incorporated by reference in their entirety.

BACKGROUND

1. Field

The present disclosure relates to the field of wireless communication, and more particularly, to a method and device for determining timing information.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In the Long Term Evolution (LTE) technology, sidelink communication includes two main mechanisms: direct communication from Device to Device (D2D) and vehicle to vehicle/infrastructure/pedestrian/network (unified abbreviated as V2X), which is designed based on D2D technology and superior to D2D in data rate, delay, reliability and link capacity, and is the most representative sidelink communication technology in LTE technology. In 5G systems, sidelink communication mainly includes V2X communication currently.

Several sidelink physical channels are defined in NR V2X systems, including Physical Sidelink Control Channel (PSCCH), Physical Sidelink Shared Channel (PSSCH) and Physical Sidelink Feedback Channel (PSFCH). The PSSCH is used to carry data, the PSCCH is used to carry Sidelink Control Information (SCI) in which information such as the time-frequency domain resource location of the associated PSSCH transmission, modulation and coding mode, the identifier ID of the receiving target for the associated PSSCH is indicated, and the PSFCH is used to carry HARQ-ACK information corresponding to the data.

SUMMARY

Aspects of the present disclosure address at least the above problems and/or disadvantages and provide at least the following advantages. Accordingly, aspects of the present disclosure provide a method and device for determining a configuration.

According to an aspect of the present disclosure, a method for determining, by a user equipment (UE), timing advance information includes receiving, by the UE, a first signal from a first device, and determining, by the UE, timing advance information TA according to the transmission time and the reception time of the first signal.

According to an aspect of the present disclosure, wherein the determining, by the UE, the timing advance information TA according to the transmission time and the reception time of the first signal includes obtaining the transmission time of the first signal according to the first signal; determining the reception time of the first signal; and determining the timing advance information TA according to the difference value between the transmission time and the reception time.

According to an aspect of the present disclosure, the method further includes determining, by the UE, timing advance update information TA_update; and determining, by the UE, a new timing advance information TA_new according to the timing advance information TA and the timing advance update information TA_update.

According to an aspect of the present disclosure, wherein the determining, by the UE, the timing advance update information TA_update includes transmitting, by the UE, a second signal according to the timing advance information TA; receiving, by the UE, a third signal; and obtaining, by the UE, the timing advance update information TA_update according to the third signal.

According to an aspect of the present disclosure, wherein the determining, by the UE, the timing advance update information TA_update includes calculating, by the UE, the timing advance update information TA_update according to a moving path of the first device.

According to an aspect of the present disclosure, the method further includes periodically detecting and receiving, by the UE, the first signal; and periodically updating, by the UE, the timing advance information TA according to the transmission time and reception time of the first signal to obtain the new timing advance information TA_new.

According to an aspect of the present disclosure, wherein the first device is at least one of a base station, a satellite, a vehicle, an infrastructure, a pedestrian or another user equipment.

According to an aspect of the present disclosure, wherein the first signal is at least one of a primary synchronization signal PSS, a secondary synchronization signal SSS, a broadcast message PBCH, a synchronization signal block SSB, a system information block SIB, and a specific time marker signal.

According to an aspect of the present disclosure, wherein the transmission time of the first signal is obtained by the UE through at least one of a physical broadcast channel PBCH; a specific primary synchronization signal PSS and/or a secondary synchronization signal SSS sequence; a demodulation reference signal DMRS sequence and/or port in a specific PBCH; transmitting a system frame number of the first signal; and scheduling a downlink control channel and/or a downlink shared channel of system information.

According to an aspect of the present disclosure, wherein the transmission time of the first signal is a first absolute time at the start point or end point of a time unit where the first signal is transmitted, and the reception time of the first signal is a second absolute time at the start point or end point of a time unit where the first signal is received.

According to an aspect of the present disclosure, wherein the first absolute time is at least one of global positioning system GPS time; other positioning system time; a time value with the GPS time as reference time; a time value with the other positioning system time as reference time; a time value with a standard time start point as reference time; and a time value with a specific time start point as reference time.

According to an aspect of the present disclosure, wherein the second absolute time is at least one of global positioning system GPS time; other positioning system time; a time value with the GPS time as reference time; a time value with the other positioning system time as reference time; a time value with a standard time start point as reference time; a time value with a specific time start point as reference time; a time value calculated by using a reference time same as the first device; and a time value calculated by using a reference time which differs from the reference time of the first device by an offset value Toffset.

According to an aspect of the present disclosure, wherein the second signal is at least one of a preamble, an uplink shared channel PUSCH and/or its demodulation reference signal DMRS, an uplink control channel PUCCH and/or its DMRS, a specific uplink signal and a sounding reference signal SRS; and wherein the third signal is at least one of a random access response and a high layer signaling MAC CE carried in a PDSCH/PDCCH.

According to an aspect of the present disclosure, the method further includes determining, by the UE, a difference value between the transmission time and the reception time of the first signal; comparing, by the UE, the difference value with a threshold value GAP to determine the type of the first device transmitting the first signal.

According to an aspect of the present disclosure, the threshold value GAP is one of being preset; and configured by the first device to the UE through a system broadcast message, and/or a system information block, and/or a UE-specific high layer signaling.

According to an aspect of the present disclosure, a user equipment (UE) for random access includes a transceiver receiving a signal from a base station and transmitting a signal to the base station; a memory storing executable instructions; a processor executing the stored instructions to perform the aforementioned method.

According to an aspect of the present application, there is provided a transmission method performed by a user equipment (UE), including: determining, by the UE, a corresponding sequence to be transmitted based on information bits to be transmitted; and transmitting, by the UE, the determined sequence to be transmitted.

Optionally, determining, by the UE, the corresponding sequence to be transmitted based on the information bit to be transmitted, includes: determining the corresponding sequence to be transmitted according to the correspondence between the information bit and the sequence; and determining the corresponding sequence to be transmitted according to the correspondence between the information bit and combinations of the sequence.

Optionally, the sequence to be transmitted is obtained from different root sequences, and/or from the same root sequence in accordance with different cyclic shifts.

Optionally, the length of the sequence is determined by at least one of the followings methods: the length of the sequence is configured by the base station; the length of the sequence is a preset fixed value; the length of the sequence is configured differently according to different categories, wherein the categories includes the format of the signal to be transmitted and/or the number of information bits; the length of the sequence is determined by the UE with the time-frequency resource configured by the base station.

Optionally, in the case where the length of the sequence is configured by the base station, the length of the sequence is determined by downlink control information (DCI) or radio resource control (RRC) signaling transmitted by the base station.

Optionally, in the case where the length of the sequence is determined by the UE with the time-frequency resource configured by the base station, the UE determines the length of the sequence with at least one of followings: the number of time units in the time domain, the number of frequency domain units in the frequency domain and the number of resource units, among the time-frequency resources configured by the base station.

Optionally, combinations of the sequence composed of the sequence to be transmitted includes repetitions of at least one sequence to be transmitted.

Optionally, the number of repeated transmissions of at least one sequence to be transmitted is configured by the base station, and/or determined based on the size of the time-frequency resource configured by the base station and/or the number of sequences to be transmitted.

Optionally, the repeated transmission positions of at least one sequence to be transmitted are consecutive or interlaced.

According to an aspect of the present application, there is provided a transmission method performed by a user equipment (UE), including: obtaining, by the UE, a transmission resource configuration; determining, by the UE, a signal to be transmitted; and mapping, by the UE, the signal to be transmitted to the configured transmission resource.

Optionally, determining, by the UE, the signal to be transmitted includes: when the UE determines the orthogonal frequency division multiplexing (OFDM) symbol, offsetting the frequency domain start position by a predetermined offset (koffset) frequency domain units.

Optionally, mapping, by the UE, the signal to be transmitted to the configured transmission resource includes: offsetting the mapped frequency domain start position by a predetermined offset (koffset).

Optionally, the predetermined offset koffset is obtained by one or more of the following methods: the UE determines koffset based on the time-frequency resources allocated to the user for transmission and the time-frequency resources actually occupied, wherein the time-frequency resource includes a size of time-domain unit, and/or a size of frequency-domain unit, and/or a size of resource element; and/or the UE determines koffset through the configuration from the base station.

Optionally, mapping, by the UE, the signal to be transmitted to the configured transmission resource further includes: among the configured transmission resource, except for the modulation symbol carrying the data signal which is to be transmitted, what on the other time-frequency resources are: modulation symbols all of which are supplemented, and/or symbols all of which are blank, and/or modulation symbols which are partially supplemented.

According to an aspect of the present application, there is provided a transmission method performed by a user equipment (UE), including: obtaining, by the UE, configuration information of a channel state information reference signal (CSI-RS); performing, by the UE, channel state measurement based on the configured CSI-RS; and feeding back, by the UE, the channel state information to the base station based on the channel state measurement result.

Optionally, obtaining, by the UE, the configuration information of the channel state information reference signal includes: the UE uses the synchronization signal block (SSB) resource configured by the base station as the configured CSI-RS; and/or the UE obtains specific CSI-RS configuration information, wherein the configuration information includes the measured period, wherein the measured period is the same as the transmission period of the SSB; and/or the measured period is a time period separately configured by the base station.

Optionally, performing, by the UE, the measurement of the channel state includes: the UE directly measures the configured CSI-RS; and/or the UE measures and selects the SSB, determines the mapped CSI-RS resource through the selected SSB, and measures the mapped CSI-RS resource.

Optionally, feeding back, by the UE, channel state information to the base station based on the channel state measurement result includes: the UE feeds back the channel state information to the base station through the physical uplink control channel (PUCCH) and/or through message 3 (msg3) of random access; wherein, in the case of feedback through PUCCH, the UE obtains the PUCCH time-frequency resource and/or sequence configuration information for feeding back channel state information by obtaining the PUCCH configuration information from radio resource control (RRC) signaling and/or downlink control information (DCI) and/or random access response (RAR), wherein DCI is the physical downlink control channel (PDCCH) for scheduling RAR, or the PDCCH for scheduling retransmission of message 3, or the dedicated PDCCH; wherein in the case of feedback through message 3 of random access, the UE performs feedback by carrying state information fed back media access control element (MAC CE) on the physical uplink shared channel (PUSCH) in the message 3 of random access; and/or adding the uplink control information (UCI) portion to the PUSCH in the message 3.

Optionally, the UE feeds back channel state information on the PUCCH resource after one reference time, wherein the one reference time is: the end position of the last CSI-RS of the CSI-RS period, or the end position of the last downlink time domain unit of the CSI-RS period; or the end position of the PDSCH of the RAR carrying the PUCCH configuration resource; or the end position of the downlink time domain unit where the PDSCH of the RAR carrying the PUCCH configuration resource is located; or the end position of the PDCCH carrying the PUCCH configuration resource; or the end position of the downlink time domain unit where the PDCCH carrying the PUCCH configuration resource is located.

According to an aspect of the present application, there is provided a user equipment including a transceiver and a controller, and the user equipment is configured to perform the above method.

According to an aspect of the present disclosure, there is provided a positioning method, including: obtaining, by a user equipment (UE), related configuration information for positioning through high layer signaling or physical layer signaling, wherein obtaining related configuration information for positioning includes: obtaining the power configuration for positioning or obtaining the random access resource configuration for positioning.

According to another aspect of the present disclosure, there is provided a positioning method, wherein the high layer signaling includes: system information or UE-specific RRC configuration information; and wherein the physical layer signaling includes downlink control information.

According to another aspect of the present disclosure, there is provided a positioning method, wherein obtaining a power configuration for positioning includes at least one of the followings: obtaining a target received power indication for positioning; obtaining a target received power offset for positioning; or when the user equipment is in the RRC connected state, the power of the last successfully transmitted uplink signal is set as the target received power for positioning.

According to another aspect of the present disclosure, there is provided a positioning method, wherein obtaining a random access resource configuration for positioning includes at least one of the followings: obtaining a random access occasion for positioning; obtaining a random access preamble for positioning; obtaining the configuration period of the random access resource for positioning; or obtaining the transmit beam configuration of the random access preamble for positioning.

According to another aspect of the present disclosure, there is provided a positioning method, wherein the random access occasion for positioning corresponds to a random access occasion index of a first time, wherein the first time includes one of the followings: random access configuration period, downlink beam to random access resource mapping cycle, downlink beam to random access resource association period, or downlink beam to random access resource association pattern period.

According to another aspect of the present disclosure, a positioning method is provided, wherein the random access occasion index is obtained through bitmap indication or table lookup.

According to another aspect of the present disclosure, there is provided a positioning method, wherein one or more downlink beams which are mapped to the random access occasion within the first time are indicated by the random access occasions index among one or more downlink beams.

According to another aspect of the present disclosure, there is provided a positioning method, wherein the random access preamble configuration for positioning includes at least one of the followings: a dedicated preamble index for positioning; or a preamble randomly selected with equal probability from the preamble resource pool.

According to another aspect of the present disclosure, there is provided a positioning method, wherein the configuration period of the random access resource for positioning includes at least one of the followings: a separate configuration period; or a random access configuration period for positioning obtained by configuring a ratio coefficient or offset on the random access configuration period.

According to another aspect of the present disclosure, there is provided a positioning method, wherein the transmit beam configuration of the random access preamble for positioning includes at least one of the followings: transmit beam index indication; the transmit beam configuration transmitting the random access preamble for positioning, which is determined based on the user equipment's own implementation; or the transmit beam configuration used in the last uplink transmission.

According to another aspect of the present disclosure, there is provided a positioning method, including: transmitting a plurality of random access preambles for positioning.

According to another aspect of the present disclosure, there is provided a positioning method, wherein, when transmitting a random access preamble for positioning, the user equipment performs at least one of the followings operations: power ramping up operation; transmitting beam determination operation; or the preamble transmission termination operation.

According to another aspect of the present disclosure, there is provided a positioning method, wherein the power ramping up operation includes at least one of the followings: whenever the number of transmitted preambles exceeds a positive integer multiple of the first number N, the power ramps up once, until the power reaches the maximum power value; or sequentially performing power ramping up on the transmission of multiple preambles.

According to another aspect of the present disclosure, there is provided a positioning method, wherein the transmit beam determination operation includes at least one of the followings: the user equipment, according to an instruction from a base station, determines the transmit beams for transmitting a plurality of random access preambles for positioning; or determine the transmit beam for transmitting the random access preamble for positioning based on the user equipment's own implementation.

According to another aspect of the present disclosure, there is provided a positioning method, wherein the preamble transmission termination operation includes at least one of the followings: when the transmitted preamble reaches a set maximum number of times, the transmission of the preamble is terminated; or when the random access procedure in progress reaches the set maximum allowable time, the transmission of the preamble is terminated.

According to another aspect of the present disclosure, there is provided a positioning method, wherein the user equipment detects random access feedback; obtains an indication for terminating transmission from the random access feedback; and according to the indication, terminates the transmission of the random access preamble for positioning.

According to another aspect of the present disclosure, there is provided a positioning method, wherein the indication for terminating transmission includes at least one of the followings: an indication bit field for terminating transmission; or through correctly receiving the feedback, the user equipment determines the indication for terminating the transmission of the preamble.

According to another aspect of the present disclosure, there is provided a device for performing a positioning method, including: a transceiver configured to transmit and receive signals to and from the outside; and a processor configured to control the transceiver to perform the above methods.

According to another aspect of the present disclosure, there is provided a computer-readable medium having computer-readable instructions stored thereon, the instructions are used to implement the method when being executed by a processor.

According to aspects of the disclosure, a user equipment (UE) can determine a timing advance according to a difference value between a transmission time and a reception time of a downlink signal received from a network device, thereby the timing advance information can be quickly and accurately obtained for uplink signal transmission.

BRIEF DESCRIPTION OF THE DRAWINGS

Through the following description of embodiments of present application taken in conjunction with the drawings, the above and other purposes, features and advantages of the present application will become more apparent, in which.

DETAILED DESCRIPTION

Figure 1:
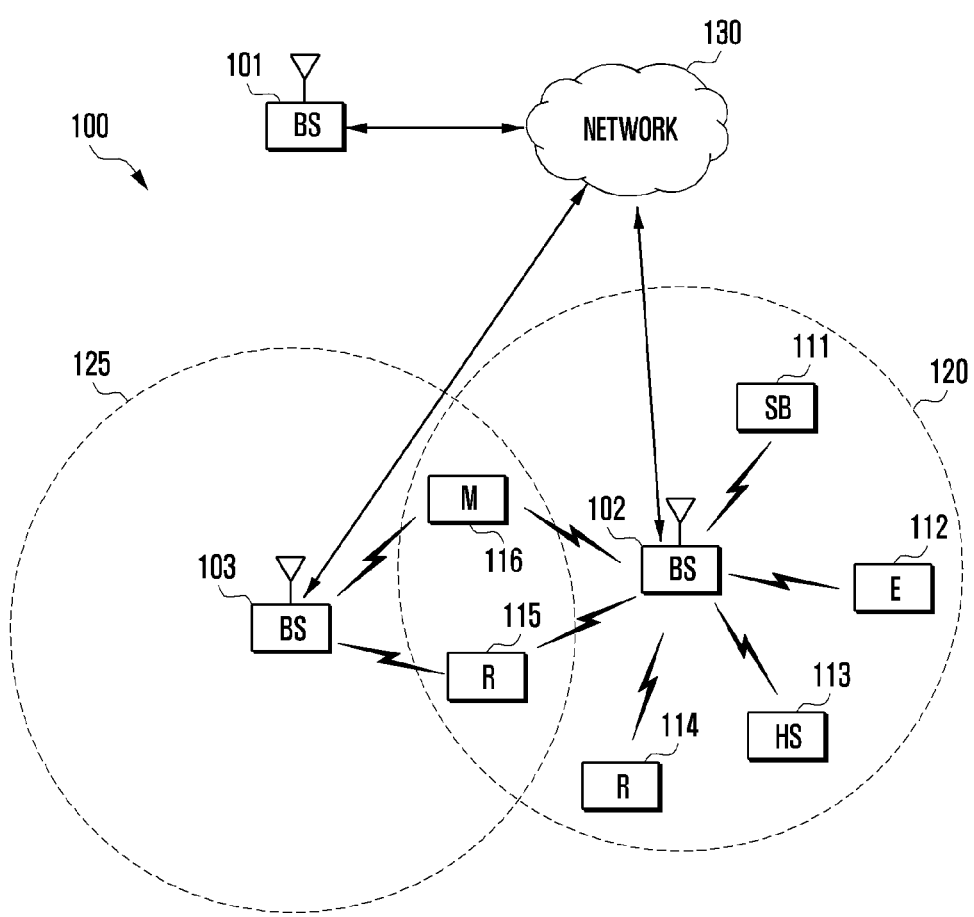
FIG. 1 illustrates an example wireless network according to various embodiments of the present disclosure.

Text and drawings are provided as examples only to help readers understand the disclosure. They are not intended and should not be interpreted as limiting the scope of this disclosure in any way. Although certain embodiments and examples have been provided, based on the disclosure herein, it will be apparent to those skilled in the art that changes may be made to the illustrated embodiments and examples without departing from the scope of the disclosure.

As will be understood by those skilled in the art, the singular forms "a", "an", "said" and "the" used herein may also include plural forms unless expressly stated. It should be further understood that the word "include" used in the specification of this disclosure means the presence of stated features, integers, steps, operations, elements and/or components, but does not exclude the presence or addition of one or more other features, integers, steps, operations, elements, components and/or groups thereof. It should be understood that when we say that an element is "connected" or "coupled" to another element, it may be directly connected or coupled to other elements, or there may be intermediate elements. In addition, "connected" or "coupled" used herein may include wireless connection or wireless coupling. As used herein, the phrase "and/or" includes all or any unit and all combinations of one or more associated listed items.

It can be understood by those skilled in the art that unless otherwise defined, all terms (including technical terms and scientific terms) used herein have the same meanings as those generally understood by those skilled in the art to which this disclosure belongs. It should also be understood that terms such as those defined in a general dictionary should be understood to have meanings consistent with those in the context of the prior art, and will not be interpreted in idealized or overly formal meanings unless specifically defined as here.

As can be understood by those skilled in the art, "terminal" and "terminal device" used herein include not only equipment of wireless signal receiver with no transmitting capability, but also equipment of receiving and transmitting hardware with equipment of receiving and transmitting hardware capable of bidirectional communication on a bidirectional communication link. In the embodiment of this disclosure, when the sidelink communication system is a V2X system, "user equipment UE", "terminal" and "terminal device" can be various types such as vehicles, infrastructures and pedestrians. Such devices may include cellular or other communication devices with single-line displays or multi-line displays or cellular or other communication devices without multi-line displays; Personal Communications Service (PCS), which can combine voice, data processing, fax and/or data communication capabilities; Personal Digital Assistant (PDA), which can include radio frequency receivers, pagers, internet/intranet access, web browsers, notepads, calendars and/or Global Positioning System (GPS) receivers; conventional laptops and/or palmtop computers or other devices having and/or including radio frequency receivers. As used herein, "terminal" and "terminal device" can be portable, transportable, installed in vehicles (aviation, sea transportation and/or land), or suitable and/or configured to run locally, and/or in distributed form, running at any other position on the earth and/or space. As used herein, "terminal" and "terminal device" can also be communication terminals, internet terminals and music/video playing terminals, such as PDA, Mobile Internet Device (MID) and/or mobile phones with music/video playing functions, as well as smart TVs, set-top boxes and other devices.

It can be understood by those skilled in the art that "base station (BS)" or "network device" used herein may refer to eNB, eNodeB, NodeB, or base transceiver station (BTS) or gNB, etc. according to the technology and terminology used.

It can be understood by those skilled in the art that the "memory" used herein can be any type suitable for the technical environment herein, and can be implemented using any suitable data storage technology, including but not limited to semiconductor-based storage devices, magnetic storage devices and systems, optical storage devices and systems, fixed memory and movable memory.

It can be understood by those skilled in the art that the "processor" used herein can be any type suitable for the technical environment herein, including but not limited to one or more of the followings: general purpose computers, special purpose computers, microprocessors, digital signal processors DSPs and processors based on multi-core processor architecture.

A time domain unit (also referred as a time unit) in this disclosure can be one OFDM symbol, one OFDM symbol group (composed of multiple OFDM symbols), one time slot, one time slot group (composed of multiple time slots), one subframe, one subframe group (composed of multiple subframes), one system frame and one system frame group (composed of multiple system frames); it can also be an absolute time unit, such as 1 ms, 1 s, etc.; a time unit can also be a combination of multiple granularities, such as N1 time slots plus N2 OFDM symbols.

The frequency domain unit in this disclosure can be one subcarrier, one subcarrier group (composed of multiple subcarriers), one resource block (RB) (also referred as physical resource block (PRB)), one resource block group (composed of multiple RBs), one bandwidth part (BWP), one band part group (composed of multiple BWPs), one frequency band/carrier, one frequency band/carrier group; it can also be an absolute frequency domain unit, such as 1 Hz, 1 kHz, etc.; a frequency domain unit can also be a combination of multiple granularities, such as M1 PRBs plus M2 subcarriers.

Embodiments according to the present disclosure will be described in detail below with reference to the accompanying drawings.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on the type of the network, other well-known terms such as "base station" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 6G, 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the present disclosure. In some embodiments, one or more of gNB 101, gNB 102, and gNB 103 support codebook designs and structures for systems with 2D antenna arrays.

Although FIG. 1 illustrates one example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
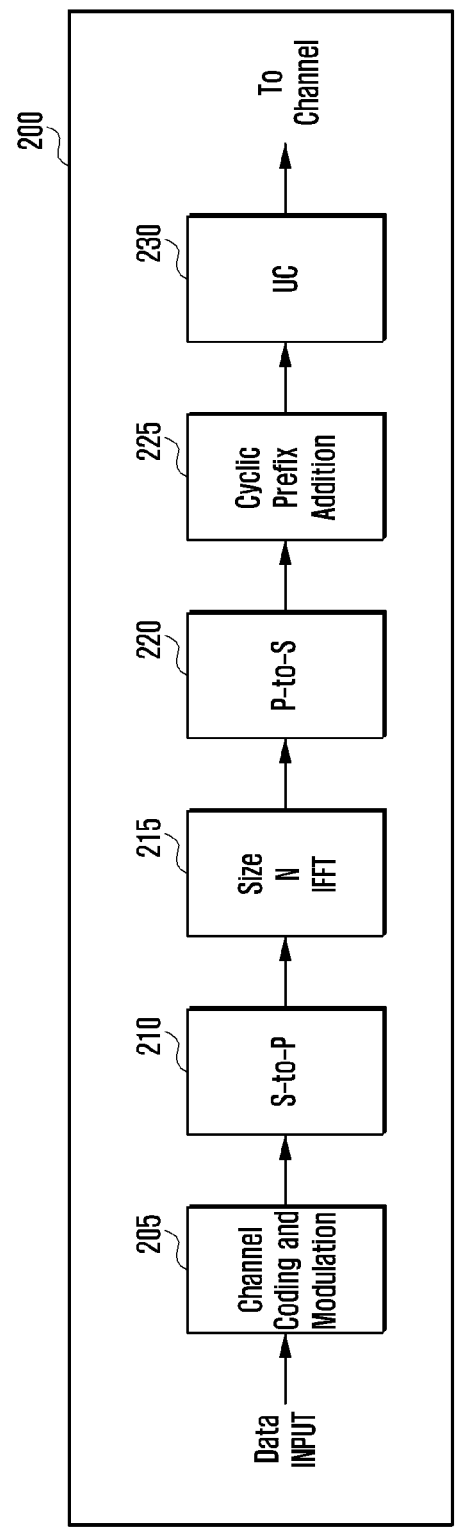
FIG. 2A illustrates an example wireless transmission path according to embodiments of the present disclosure.
Figure 2B:
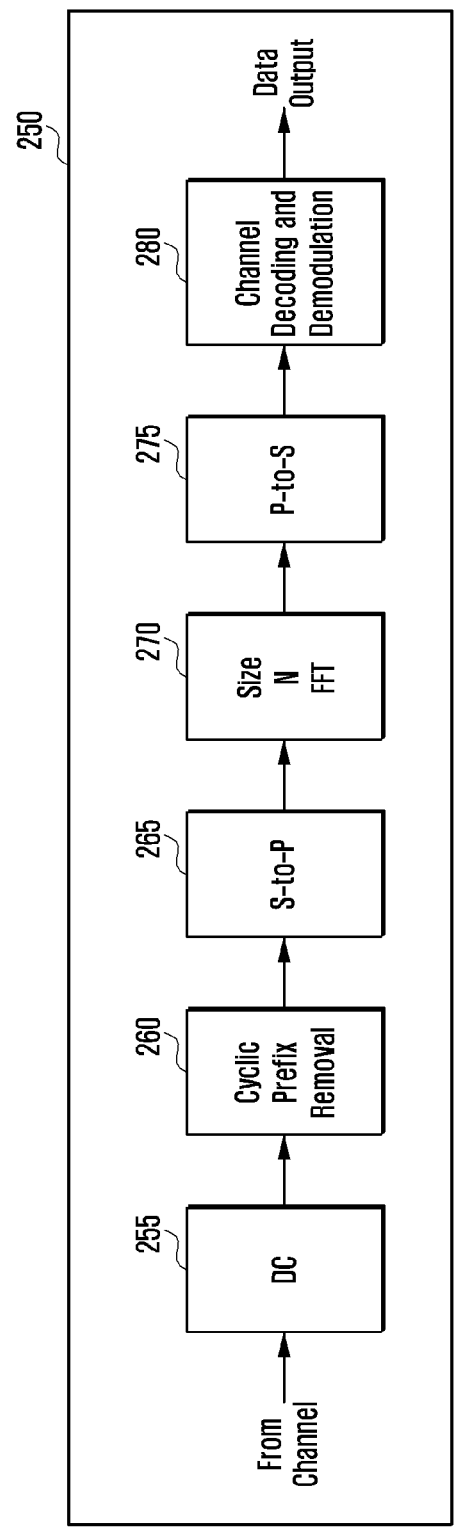
FIG. 2B illustrates an example wireless reception path according to embodiments of the present disclosure.

FIG. 2A illustrates an example wireless transmission path according to embodiments of the present disclosure; and FIG. 2B illustrates an example wireless reception path according to embodiments of the present disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the present disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
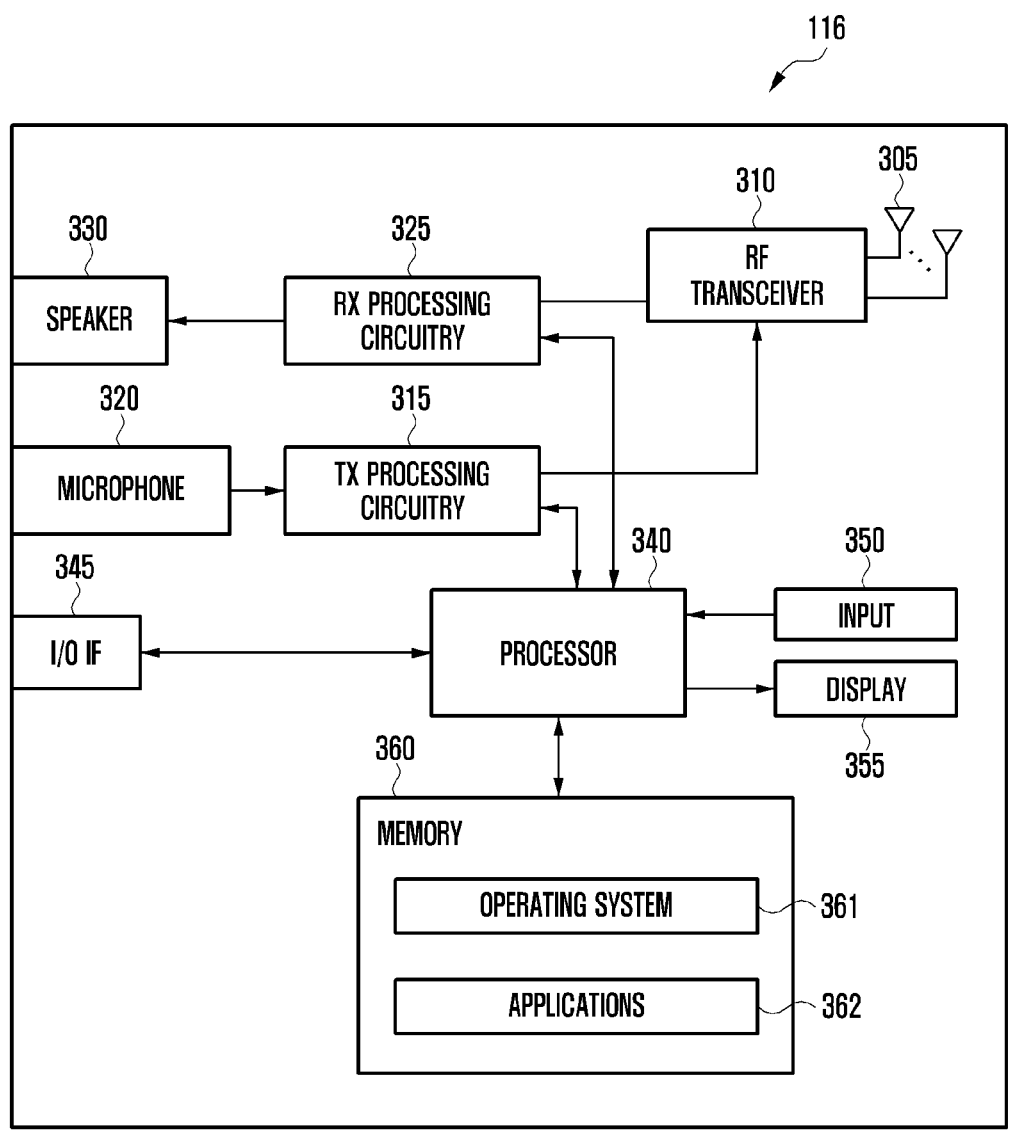
FIG. 3A illustrates an example UE according to embodiments of the present disclosure.

FIG. 3A illustrates an example UE 116 according to the present disclosure. The embodiment of UE 116 shown in FIG. 3A is for illustration only, and UEs 111-115 of FIG. 1 can have the same or similar configuration. However, a UE has various configurations, and FIG. 3A does not limit the scope of the present disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates one example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
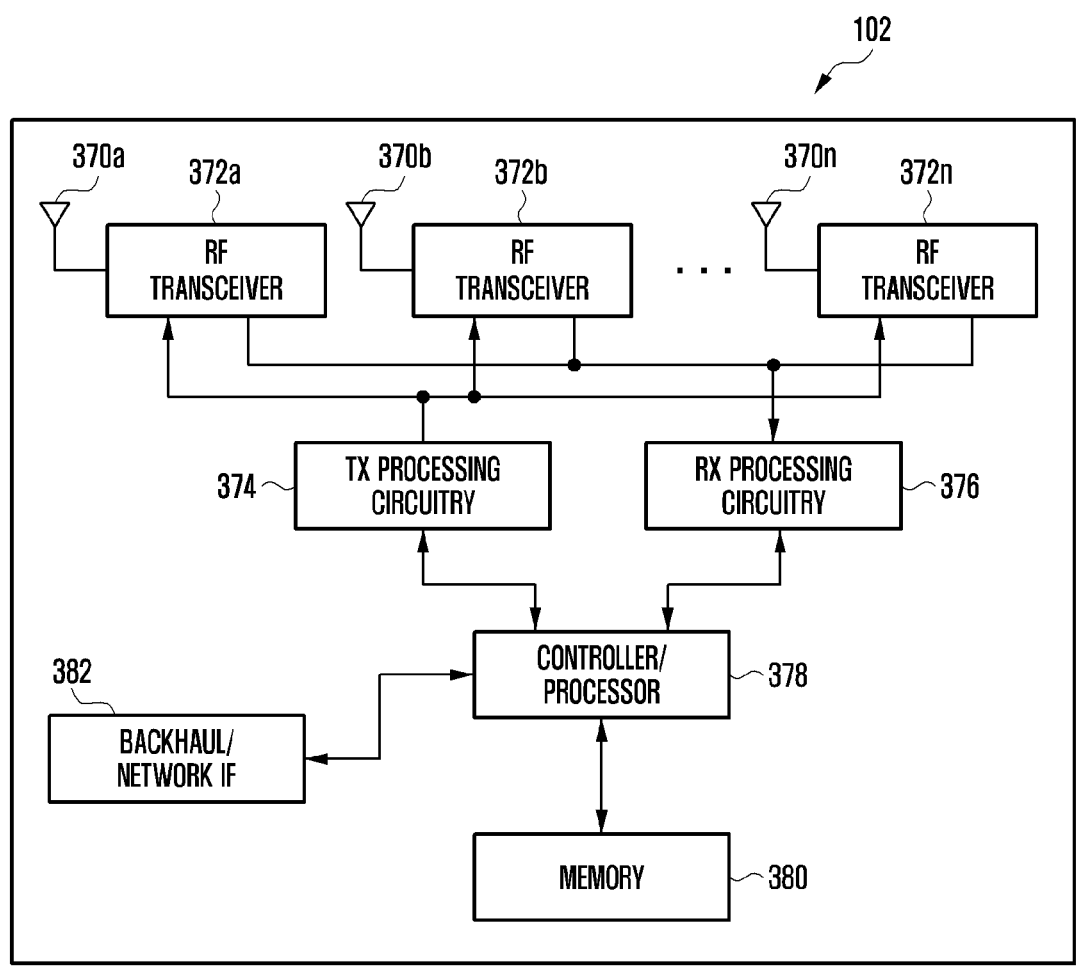
FIG. 3B illustrates an example gNB according to embodiments of the present disclosure.

FIG. 3B illustrates an example gNB 102 according to the present disclosure. The embodiment of gNB 102 shown in FIG. 3B is for illustration only, and other gNBs of FIG. 1 can have the same or similar configuration. However, a gNB has various configurations, and FIG. 3B does not limit the scope of the present disclosure to any specific implementation of a gNB. It should be noted that gNB 101 and gNB 103 can include the same or similar structures as gNB 102.

As shown in FIG. 3B, gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. GNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 6G or 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3B illustrates one example of gNB 102, various changes may be made to FIG. 3B. For example, gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

Figure 4:
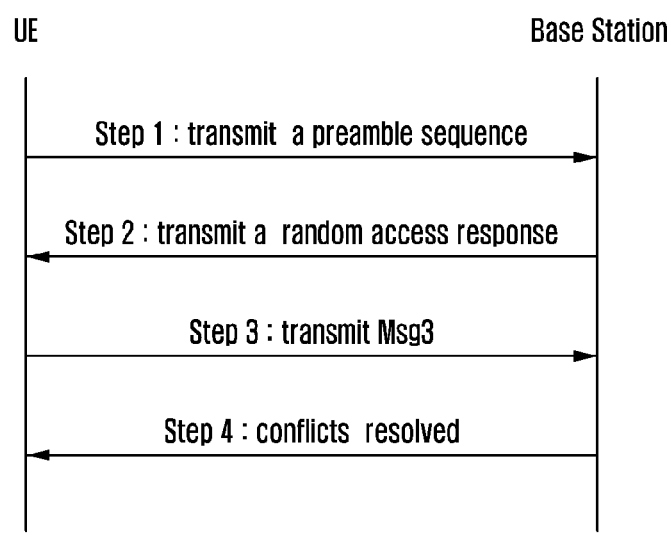
FIG. 4 illustrates a contention-based random access procedure according to embodiments of the present disclosure.

FIG. 4 illustrates a contention-based random access procedure according to embodiments of the present disclosure.

Transmissions in a wireless communication system include: transmission from a base station (gNB) to a user equipment (UE) (referred as downlink transmission), wherein time slots being referred to as downlink time slots, and transmission from the UE to the base station (referred as uplink transmission), wherein time slots being referred to as uplink time slots.

In the downlink communication of a wireless communication system, the system periodically transmits synchronization signals and broadcast channels to users through synchronization signal block (SSB)/PBCH block, the period of which is SSB periodicity, or referred to as SSB burst periodicity. At the same time, the base station will configure a Physical Random Access Channel Configuration Period (PRACH configuration period) in which a certain number of random access transmission occasions (also referred to as PRACH occasions (ROs)) are configured and a condition that all SSBs can be mapped to corresponding ROs within a mapping period (a certain length of time) is satisfied.

In a New Radio (NR) communication system, before the establishment of radio resource control, such as in a random access procedure, the performance of random access directly affects user experience. In a conventional wireless communication system, such as LTE and LTE-Advanced system, the random access procedure is applied in many scenarios, such as establishing initial connection, cell handover, reestablishing uplink, RRC connection reestablishment, etc., and is classed into Contention-based Random Access procedure and Contention-free Random Access procedure according to whether a user monopolizes preamble sequence resources. In a Contention-based Random Access procedure, each user selects a preamble sequence from same preamble sequence resources in the process of attempting to establish an uplink, which may cause multiple users to select a same preamble sequence for transmitting to the base station. Therefore, conflict resolution mechanism is an important research direction in random access. How to reduce the conflict probability and how to quickly resolve the conflicts already occurred are key indexes that affect the performance of random access.

The Contention-based Random Access procedure in LTE-A is divided into four steps, as shown in FIG. 4. In the first step, a user randomly selects a preamble sequence from the preamble sequence resource pool and transmits it to a base station. The base station performs correlation detection on a received signal, thereby identifying the preamble sequence transmitted by the user; in the second step, the base station transmits a Random Access Response (RAR) to the user, which comprises a random access preamble sequence identifier, a timing advance instruction determined according to a time delay estimation between the user and the base station, a cell-radio network temporary identifier (C-RNTI), and time-frequency resources allocated for the next uplink transmission of the user; in the third step, the user transmits a third message (which can also be referred as message 3, Msg3) to the base station according to the information in the RAR, wherein Msg3 contains information such as user terminal identifier and RRC link request, wherein the user terminal identifier is unique to the user and is used to resolve conflicts; in the fourth step, the base station transmits a conflict resolution identifier to the user which comprising the identifier of the user terminal that won in the conflict resolution. After detecting its own identifier, the user upgrades the temporary C-RNTI to C-RNTI, and transmits ACK signal to the base station, completes the random access procedure, and waits for the scheduling by the base station. Otherwise, the user will start a new random access procedure after a period of time delay.

For a Contention-free Random Access procedure, since the base station knows the user identifier, the user can be allocated with a preamble sequence. Therefore, when transmitting the preamble sequence, the user does not need to randomly select a preamble sequence, but will use the allocated preamble sequence. After detecting the allocated preamble sequence, the base station will transmit a corresponding random access response comprising information such as timing advance and uplink resource allocation, etc. After receiving the random access response, the user considers that the uplink synchronization has been completed and waits for further scheduling by the base station. Therefore, Contention-free Random Access procedure only includes two steps: step one is to transmit a preamble sequence; step two is to transmit a random access response.

Random access procedure in LTE is suitable for the following scenarios:
1. Initial access under RRC_IDLE;
2. Reestablishment of RRC connection;
3. Cell handover;
4. In RRC connected state, downlink data arrives and a random access procedure is requested (when uplink is in asynchronous);
5. In RRC connected state, uplink data arrives and a random access procedure is requested (when uplink is in asynchronous or there is no resource allocated for a scheduling request in PUCCH resources); and
6. Positioning; and
7. Beam failure recovery (BFR).

In the 5G Rel-16 standard of 3GPP, related research on Non-terrestrial networks (NTN) has been conducted. With the wide-area coverage capability of satellites, NTN may allow operators to provide 5G commercial services in areas where ground network infrastructures are underdeveloped and achieve 5G service continuity, especially in scenarios such as emergency communication, maritime communication, aviation communication and communication along railways.

In NTN, according to whether satellites have the ability to decode 5G signals, scenarios can be divided into two types: transparent payload-based scenario and regenerative payload-based scenario. In the transparent payload-based scenario, satellites do not have the ability to decode the 5G signals, and satellites directly transparently transmit the received 5G signals transmitted by a ground terminal to the NTN gateway on the ground. In the regenerative payload-based scenario, satellites have the ability to decode 5G signals, and satellites decode the received 5G signals transmitted by a ground terminal, and then re-encode and transmit decoded data, which can be directly transmitted to a ground NTN gateway, or transmitted to other satellites and then forwarded from other satellites to the ground NTN gateway.

Since satellites are extremely high from the ground (for example, the height of a low-orbit satellite is 600 km or 1200 km, and the height of a synchronous satellite is close to 36,000 km), the transmission time delay of communication signals between a ground terminal and a satellite is extremely large, even reaching tens or hundreds of milliseconds, while in conventional ground cellular networks, the transmission time delay is only tens of microseconds. Such extremely large difference makes NTN need to use different physical layer technologies from ground networks, for example, it will affect physical layer technologies such as time-frequency synchronization/tracking, Timing Advance of uplink transmission, physical layer process, and HARQ retransmission sensitive to time delay transmission, etc.

One effect of the extremely large transmission time delay is that it is difficult to obtain timing advance information, so how to obtain timing advance information for uplink signal transmission quickly and accurately is a problem need to be solved.

In the procedure of transmitting the uplink control information, the performance of the uplink signal transmitted using the coded modulation method may be limited in the case of a low signal-to-noise ratio, and how to improve the performance of the uplink signal in this case is a problem that needs to be solved.

The present disclosure proposes a method for carrying information bits based on a sequenced signal, so as to solve the problem that the performance of the uplink signal transmitted using a coded modulation method may be limited in the case of a low signal-to-noise ratio. Preferably, the method proposed in the present disclosure is not only applicable to the transmission of uplink signals, but also can be adaptively applied to scenarios such as vehicle to everything (V2X) communication (for example, bypass transmission) or satellite communication transmission.

According to an exemplary embodiment of the present disclosure, in the transmission of uplink signals, the UE may carry information bits through a sequence. The implementation of the present disclosure is illustrated below by taking PUCCH transmission as an example, but the technical solution of the present disclosure is not limited to transmitting PUCCH, and it is also used for PUSCH, random access procedures, etc., for example.

Figure 5:
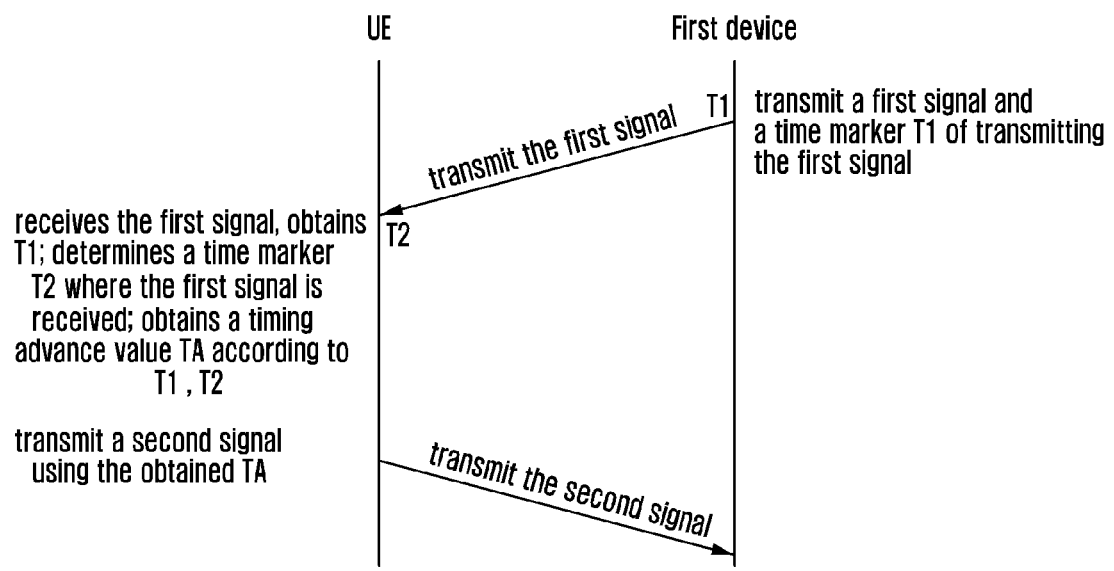
FIG. 5 is a general example flowchart illustrating obtaining a timing advance value according to embodiments of the present disclosure.
Figure 6:
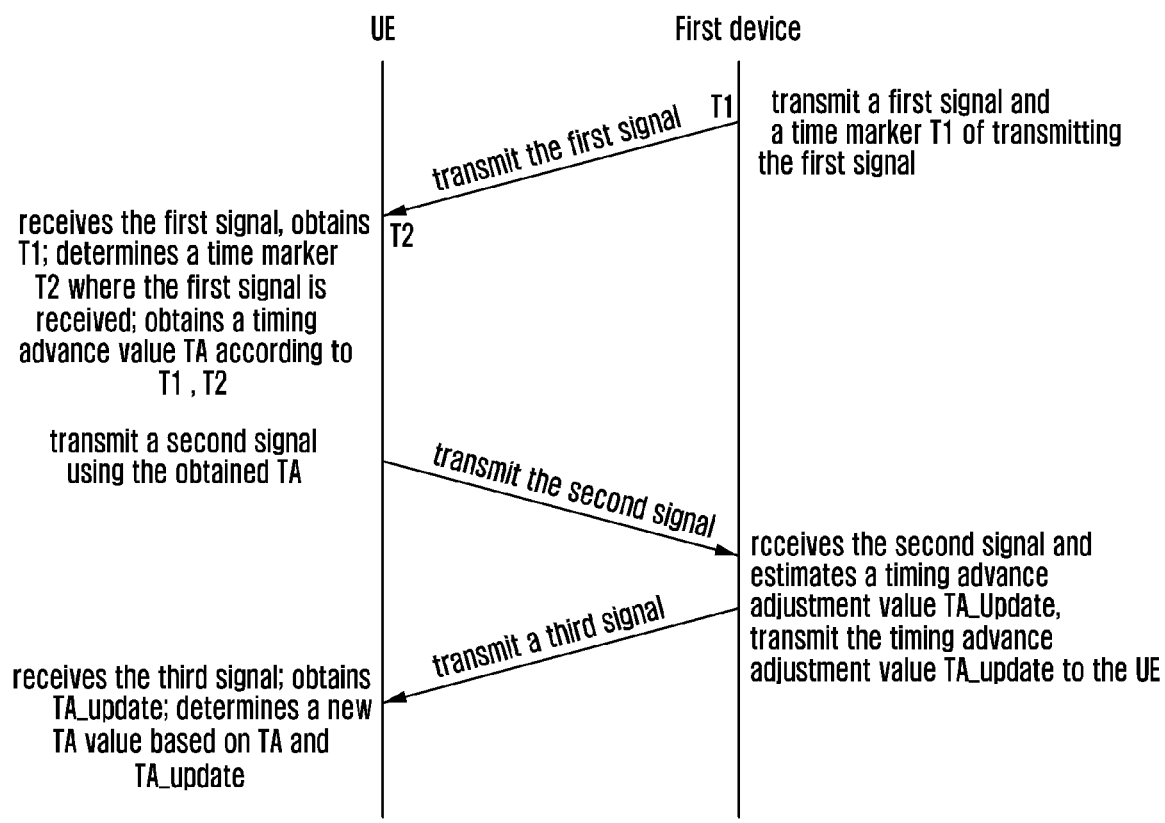
FIG. 6 is a general example illustrating obtaining a new TA value based on a timing advance adjustment according to embodiments of the present disclosure.

FIG. 5 is a general example flowchart illustrating obtaining a timing advance value according to embodiments of the present disclosure, and FIG. 6 is a general example illustrating obtaining a new timing advance value based on a timing advance adjustment according to embodiments of the present disclosure.

General examples of obtaining timing advance values and obtaining a new timing advance value based on a timing advance update value will be described below with reference to FIGS. 5 and 6.

As shown in FIG. 5, a user equipment (UE) receives a first signal from a first device and is notified by the first device of the transmission time of the first signal. The UE receives a first signal, and decodes the first signal to obtain a time marker T1 indicating the transmission time of the first signal. In addition, the UE also obtains the reception time of the first signal, wherein the reception time of the first signal is indicated by a time marker T2. A timing advance value TA is calculated based on the time marker T1 and the time marker T2. The UE transmits a second signal using the timing advance value TA after the timing advance value TA is obtained.

FIG. 6 illustrates a process of obtaining a new TA value through a timing advance update value. The obtaining process of the timing advance value TA shown in FIG. 6 is the same as that in FIG. 5, and the description thereof will be omitted here. After the UE in FIG. 5 transmits the second signal using the timing advance value TA, the process in FIG. 6 further includes: the UE receives a third signal and is notified of the timing advance update value TA_update by the first device. The UE receives the third signal, obtains the timing advance update value TA_update according to the third signal, and obtains a new timing advance value TA_new based on the timing advance value TA and the timing advance update value TA_update.

General examples of obtaining a timing advance value and obtaining a new timing advance value based on a timing advance update value have been described above with reference to FIGS. 5 and 6. With the above embodiments, the UE can determine a timing advance value according to the difference value between the transmission time and the reception time of the first signal and accordingly update to obtain a new timing advance value, so as to facilitate the transmission of signals.

Wherein, the first device may be a device that communicates with the UE through protocols that can be reasonably anticipated by those skilled in the art, including but not limited to a base station, a satellite, a vehicle, an infrastructure, a pedestrian or another user equipment.

Wherein, the first signal, the second signal and the third signal are signals suitable for transmission between the UE and the first device according to a corresponding protocol, including but not limited to uplink and downlink signals in a cellular network, data transported on sidelink channels, signaling, a control message, etc.

Wherein, the first device may inform the UE of the time marker T1 in any suitable manner according to a corresponding protocol.

Wherein, the time marker T1 and the time marker T2 are absolute time, including but not limited to, GPS time or other positioning system time; a time value obtained by taking GPS positioning time as reference time; or a time value obtained by taking other positioning system time as reference time; a time value calculated by taking a standard time start point as reference; a time value calculated by taking a specific reference time start point as reference; a time value calculated based on the UE and the first device using a same reference time; a time value calculated based on the offset value of the reference times between the UE and the first device.

Wherein, the timing advance value TA is based on the difference value between the time marker T1 and the time marker T2. The new timing advance value TA_new may be obtained in a manner such as an iterative manner and a periodic manner based on the timing advance value TA and the timing advance update value TA_update.

The embodiments described above with reference to FIGS. 5 and 6 are not limited to a certain application scenario. For a clearer understanding of the embodiments of this disclosure, the above embodiments will be described below in conjunction with a specific application scenario. Specifically, with reference to FIG. 7 to FIG. 10, the above process will be described in an example of a network side device in cellular network communication as the first device; and with reference to FIG. 11, the above process will be described in an example of a device in a V2X environment as the first device. Those skilled in the art will understand that the following description is not intended to limit the embodiments of the present disclosure to certain application scenarios, but only by way of example to help understanding.

Figure 7:
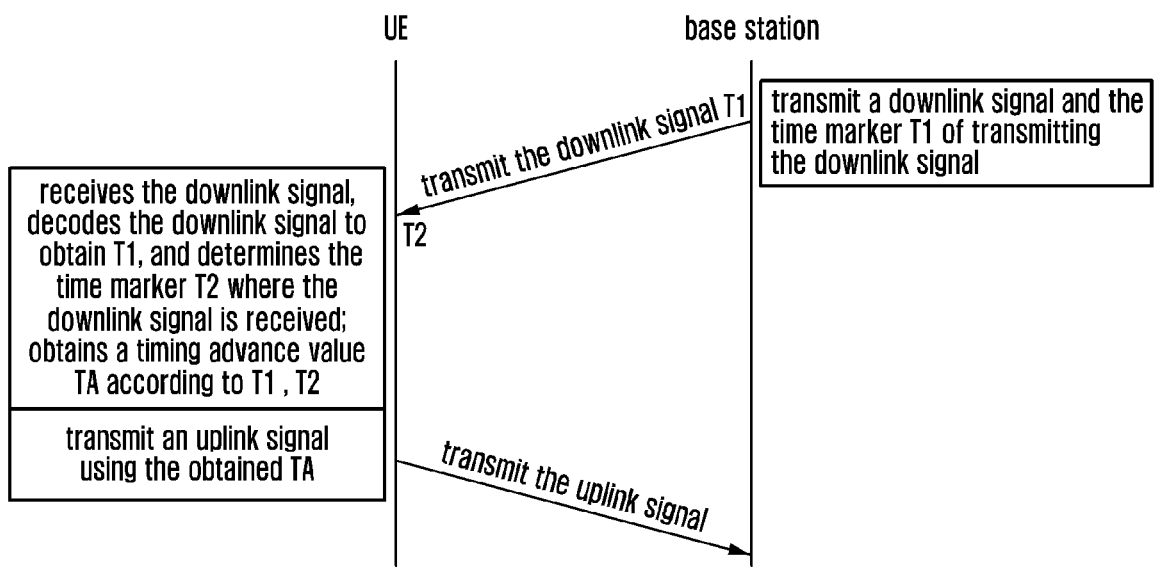
FIG. 7 is an example flowchart illustrating a timing advance value being obtained by a UE from a base station according to embodiments of the present disclosure.

FIG. 7 is an example flowchart illustrating a timing advance value being obtained by a UE from a base station according to an embodiment of the present disclosure.

Specifically, in this embodiment, a method for UE determining timing advance information will be described.

The user equipment receives a downlink signal X_D transmitted by a network device (e.g., a base station), and obtains a time marker T1 of transmitting the downlink signal X_D notified by the network device to the user equipment. The downlink signal X_D can be at least one of the followings:

a master synchronization signal PSS;
a secondary synchronization signal SSS;
a broadcast message PBCH;
a SSB (where it can be an arbitrary or specific SSB index, such as an SSB index designated for obtaining a time marker);
a system information block (SIB, wherein it can be SIB 1 or other SIB index);
a specific time marker signal;
preferably, the downlink synchronization signal is a periodic signal, and its period can be a fixed value or a period value configured by network side.

Wherein, a method for the network device transmitting the time marker T1 of the downlink signal X_D to the user equipment can be at least one of the followings:

notifying by a broadcast message PBCH; particularly, notify by using bits in PBCH or MIB that do not need to be scrambled (and/or not used for combining);

notifying by a specific PSS and/or SSS sequence;
notifying by a DMRS sequence and/or port in specific PBCH;
notifying by transmitting a system frame number where X_D is located, such as SFN 9;
notifying by scheduling downlink control channels and/or downlink shared channels for system information.

Wherein, the time marker T1 may be at least one of the followings:
  the absolute time value of the start or end point of the time unit where the transmitted downlink signal X_D is located, such as the absolute time value corresponding to the end point of the symbol occupied by X_D or the end point of the system frame where X_D is located, and the absolute time value can be at least one of the followings:
    GPS time, or other positioning system time; a time value obtained by taking GPS positioning time as reference time; or a time value obtained by taking other positioning system time as reference time;
    a time value calculated with a standard time start point (for example, 00:00:00 on Jan. 6, 1980 in the Gregorian calendar) as reference;
    a time value calculated with a specific reference time start point as reference.

Determining, by the user equipment, the timing advance information further includes conducting at least one of the followings operations after receiving the downlink signal X_D:
  obtaining a time marker T1 indicated by the base station by receiving X_D;
  determining a time marker T2 of receiving the X_D signal; wherein the time marker T2 may be at least one of the followings:
    GPS time, or other positioning system time; a time value obtained by taking GPS positioning time as reference time; or a time value obtained by taking other positioning system time as reference time;
    a time value calculated with a standard time start point (for example, 00:00:00 on Jan. 6, 1980 in the Gregorian calendar) as reference;
    a time value calculated with a specific reference time start point as reference;
    a time value calculated by using the same reference time as the network device;
    a time value calculated by using a reference time which differs from the reference time of the network device by an offset Toffset; wherein the Toffset is a preset or fixed value or a value configured by the network device;
  determining a timing advance value TA, where TA=2*Tgap; Tgap=T2−T1 represents the time difference between transmitting a signal from the base station and receiving the signal by the UE, which is proportional to the distance between the base station and the UE, that is, the greater the distance between the base station and the UE, the greater the Tgap; preferably Tgap=T2−T1+Toffset, where Toffset is the difference value between the reference time adopted by T1 and the reference time adopted by T2.

With the method described in the above embodiments, the user equipment can determine the timing advance according to the difference value between the transmission time and the reception time of the downlink signal received from the network device, thereby the timing advance information can be quickly and accurately obtained for uplink signal transmission.

Figure 8:
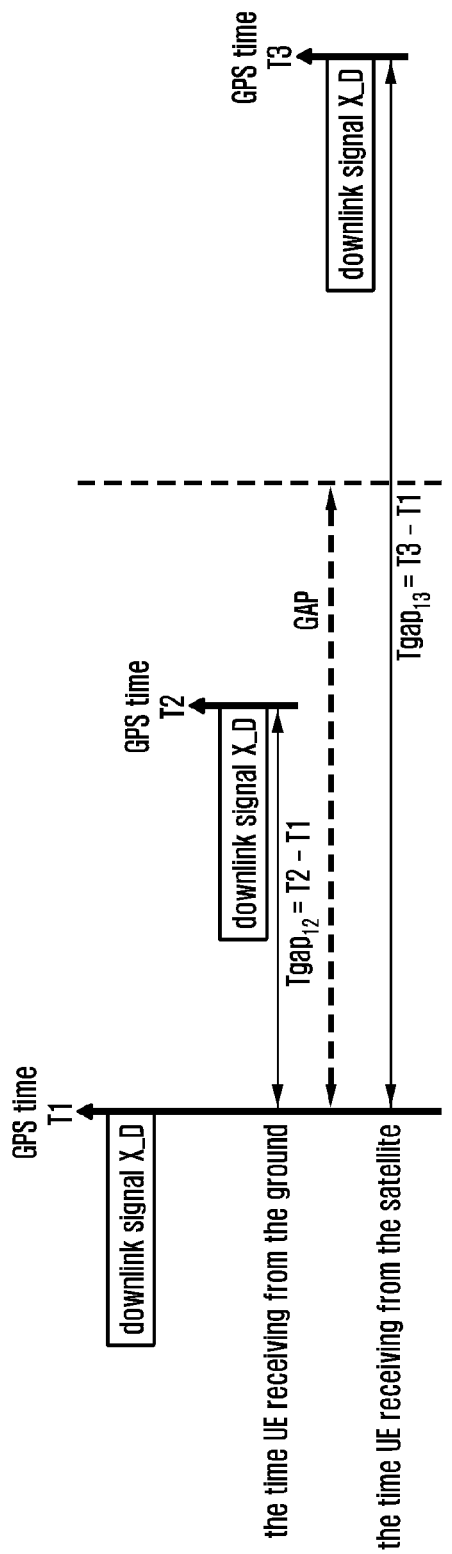
FIG. 8 is an example diagram illustrating deciding a downlink signal source base station according to embodiments of the present disclosure.

FIG. 8 is an example diagram illustrating deciding a downlink signal source base station according to an embodiment of the present disclosure.

Specifically, in this embodiment, a method for UE determining the source base station of the downlink signal will be described.

The UE may decide whether a received signal comes from a closer base station (e.g., a ground base station) or a farther base station (e.g., a satellite base station) by an obtained Tgap value. Specifically:
  the UE obtains a Tgap value,
  the UE compares the obtained Tgap value with a threshold value GAP preset (fixed) or configured by the network device; preferably, the network device configures the threshold value GAP to the user equipment through system broadcast messages, and/or system information blocks (including necessary system information blocks such as SIB 1 and/or other specific system information blocks such as SIB 9, etc.) and/or UE-specific high layer signaling; where:
  if Tgap is greater than (or not less than) GAP, the UE considers that the signal comes from a farther base station, such as from a satellite base station; that is, subsequent operations can be performed, such as selecting a corresponding antenna and a transmission device suitable for the characteristics of satellite transmissions; as shown in FIG. 6;
  if Tgap is less than (or not greater than) GAP, the UE considers that the signal comes from a closer base station, for example, directly from a ground base station; that is, subsequent operations can be performed, such as selecting a corresponding antenna and a transmission device suitable for the characteristics of ground transmissions; as shown in FIG. 6.

With the method described in the above embodiment, the user equipment can determine the source base station according to the difference value between the transmission time and the reception time of the downlink signal received from the network device, thereby subsequent operations can be conducted.

Figure 9:
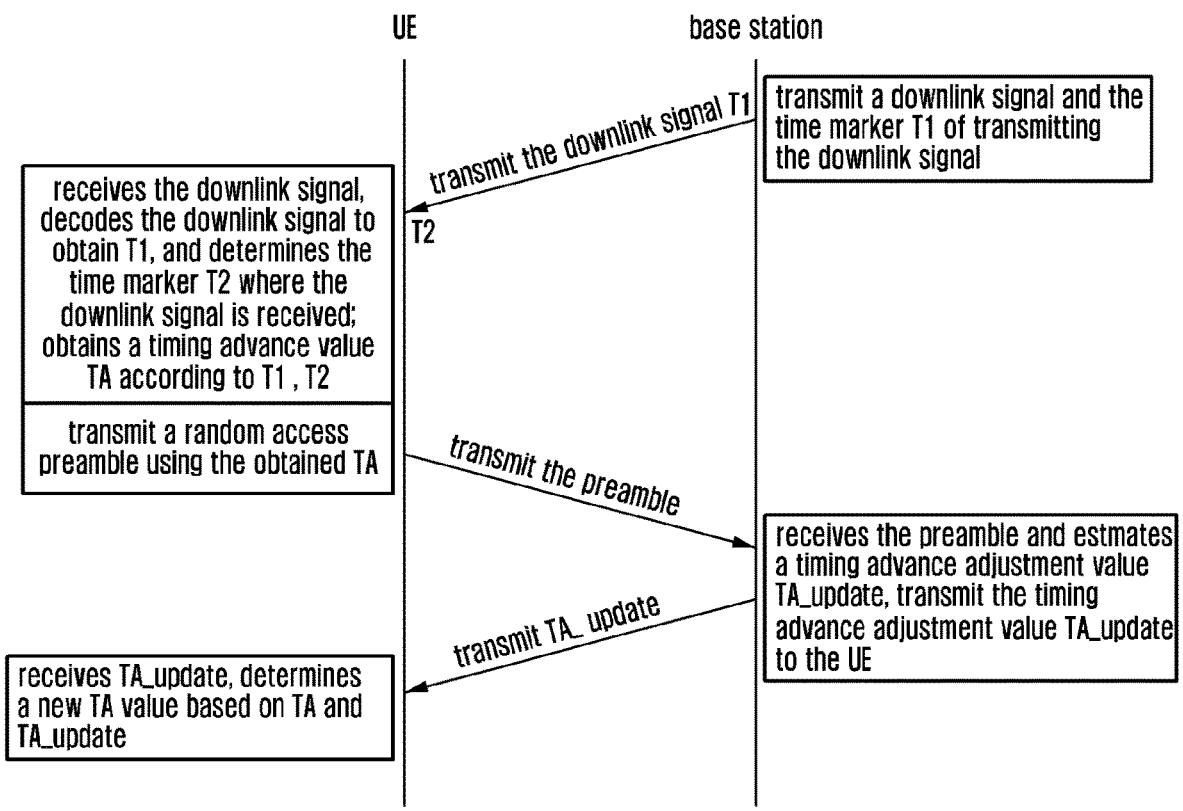
FIG. 9 is an example diagram illustrating obtaining a new TA value based on a timing advance update value according to embodiments of the present disclosure.

FIG. 9 is an example diagram illustrating obtaining a new TA value based on a timing advance update value according to an embodiment of the present disclosure.

Specifically, in this embodiment, a method for a UE obtaining a new TA value will be described.

Preferably, after obtaining the timing advance value described above, the UE can use the obtained timing advance value for uplink transmission. Specifically, the UE transmits the uplink signal X_U by using the obtained timing advance value; a base station estimates the timing difference of the UE based on the received uplink signal, determines the timing advance update value TA_update to be transmitted to the UE based on the timing difference, and transmits the timing advance update value TA_update to the UE through the downlink signal X_D2; the UE receives the downlink signal X_D2 and obtains TA_update, and then calculates a new TA value according to TA(n+1)=TA(n)+TA_update, where n represents the TA value at the nth time. The expression calculates a new timing advance value that the UE obtains by a previous timing advance value and an obtained timing advance update value; wherein the timing update value may be positive (i.e., the new timing advance value is larger than the previous timing advance value, for example, the distance between the UE and the base station has increased), may also be negative (i.e., the new timing advance value is smaller than the previous timing advance value, for example, the distance between UE and base station has decreased), or may be 0 (i.e., the timing advance value is not changed). Wherein the uplink signal X_U may be at least one of the followings signals:
- a preamble (random access preamble);
- uplink shared channels (PUSCH); and/or DMRS thereof;
- uplink control channels (PUCCH); and/or DMRS thereof;
- a specific uplink signal;
- a sounding reference signal (SRS);

Wherein, the downlink signal X_D2 may be at least one of the followings:
- random access response (RAR) or msgB resource, especially, the downlink signal is only for the case that the uplink signal is a preamble (random access preamble) or msgA (preamble+uplink shared channel); as shown in FIG. 7;
- a high layer signaling MAC CE carried in the PDSCH/PDCCH.

With the method described in the above embodiment, the user equipment may obtain a new timing advance value according to a timing advance update value from the network device, thereby subsequent operations can be performed.

Figure 10:
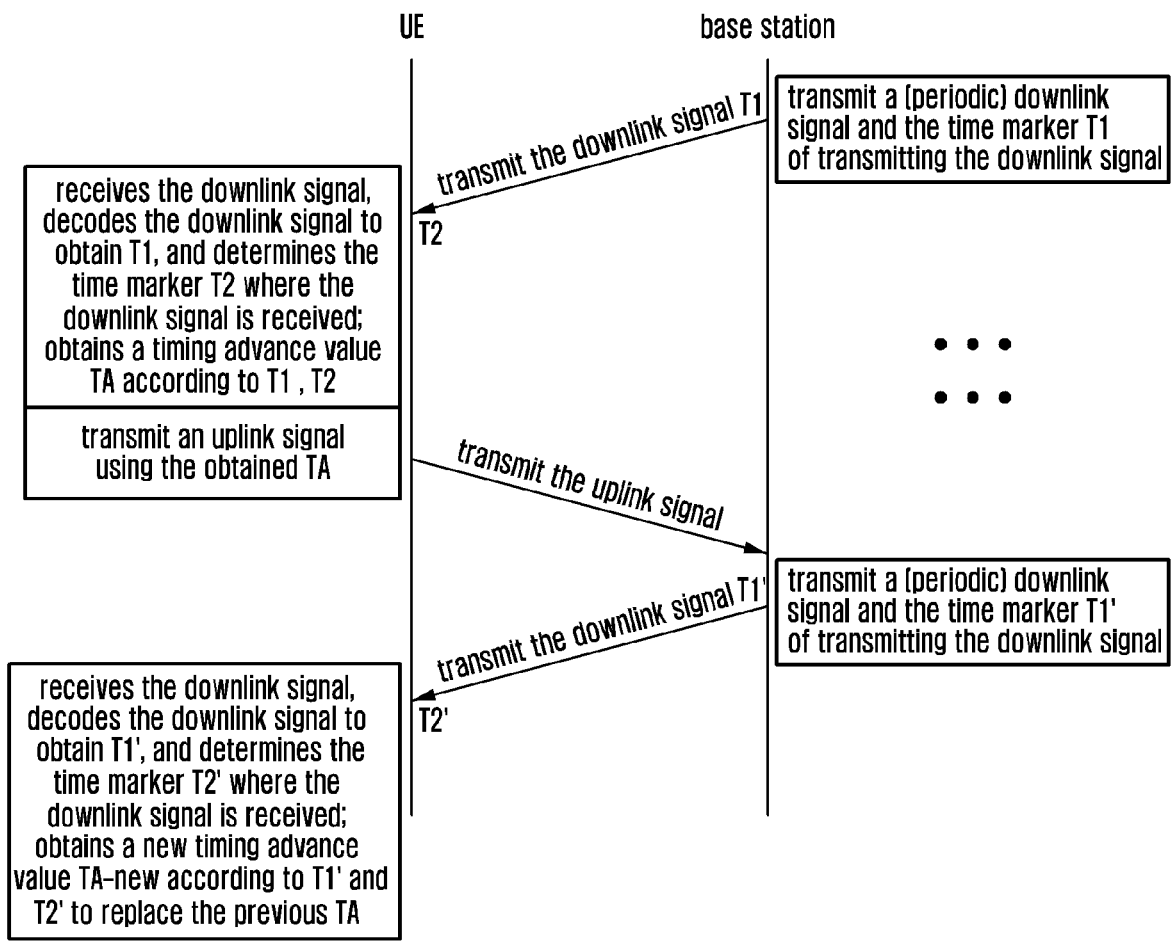
FIG. 10 is an example diagram illustrating obtaining a new TA value based on a newly received downlink signal according to embodiments of the present disclosure.

FIG. 10 is an example diagram illustrating obtaining a new TA value based on a newly received downlink signal according to embodiments of the present disclosure.

The UE may also obtain a new timing advance value by receiving the downlink signal X_D (i.e., the new timing advance value is not obtained by the above manner for obtaining the timing advance update value); that is, at time N, the UE obtains the timing advance value TA through X_D according to the above method, and at time N+t, the UE obtains a new timing advance value (denoted as TA_new) again through X_D according to the above method; then the UE uses TA_new instead of TA for subsequent uplink signal transmission; as shown in FIG. 10. Preferably, the method is more suitable for obtaining the timing advance value when X_D is a periodic signal.

In addition, the UE can also calculate a moving path of a base station (especially a mobile base station, such as a satellite base station), for example, at time N, the UE uses TA for uplink transmission; and at time N+delta_t, the UE may calculate that a change of distance from the base station, thereby the UE can obtain TA_update=delta_d/c that needs to be updated; where c is the speed of light; preferably, the calculated delta_d/c should be quantized to obtain the TA_update value, for example, TA_update is quantized according to a certain time granularity T_step, for example, TA_update=3 represents a numerical value of 3*T_step, TA_update=[delta_d/c/T_step], and the [x] represents a rounding operation on x, which can be an up-rounding operation or a down-rounding operation.

Figure 11:
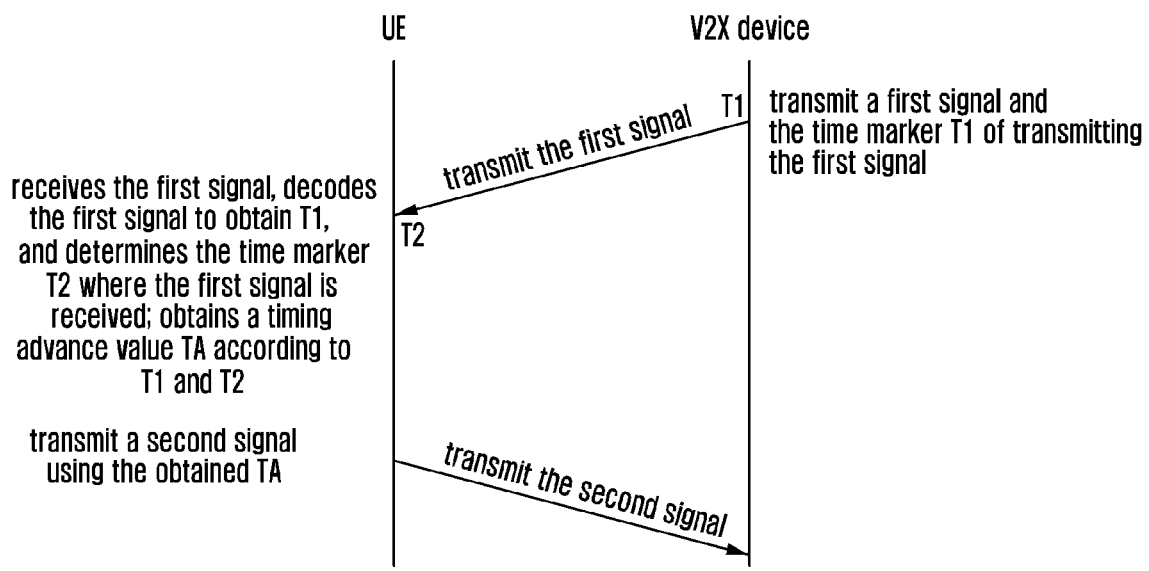
FIG. 11 is an example flowchart illustrating obtaining a timing advance value in a V2X environment according to embodiments of the present disclosure.

FIG. 11 is an example flowchart illustrating obtaining a timing advance value in a V2X environment according to embodiments of the present disclosure.

FIG. 11 illustrates the general flows of obtaining a timing advance value in V2X environment.

As shown in FIG. 11, a user equipment (UE) receives a first signal from a V2X device and is notified by the V2X device of the transmission time of the first signal. The UE receives the first signal, and decodes the first signal to obtain a time marker T1 indicating the transmission time of the first signal. In addition, the UE also obtains the reception time of the first signal, the reception time of the first signal is indicated by a time marker T2. A timing advance value TA is calculated based on the time marker T1 and the time marker T2. The UE transmits a second signal using the timing advance value TA after obtaining the timing advance value TA.

Those skilled in the art will understand that various steps described above with reference to FIGS. 5 to 10 can be performed for V2X environment based on various requirements, such as transmitting the second signal based on the timing advance value TA, receiving a third signal and being informed of the timing advance update value, and obtaining a new timing advance value based on the timing advance value and the timing advance update value, etc. Herein, in order to avoid unnecessarily obscuring the subject matter of the present disclosure, it will not be described in detail.

Through the above various example flows, in V2X environment, UEs can obtain timing advance information to facilitate the transmission of signals.

Figure 12:
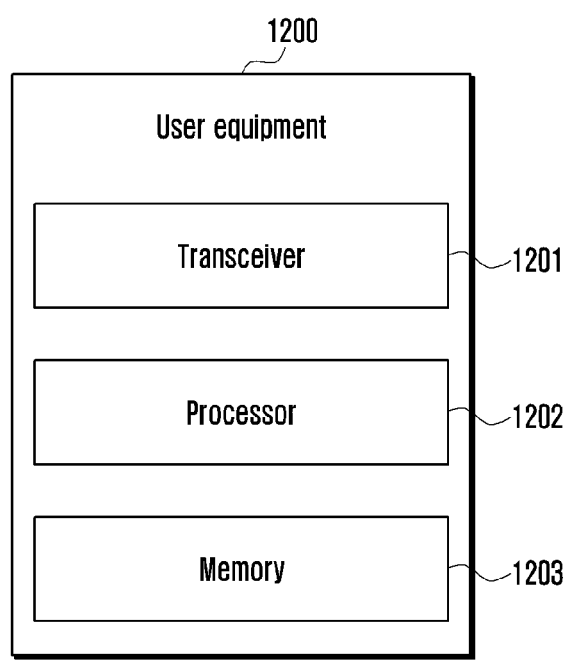
FIG. 12 is a block diagram illustrating a UE according to embodiments of the present disclosure.

FIG. 12 is a block diagram illustrating a UE according to embodiments of the present disclosure.

Referring to FIG. 12, a UE (1200) includes a transceiver (1201), a processor (1202) and a memory (1203). The transceiver (1201), processor (1202) and memory (1203) are configured to perform the operations of the UE shown in the Figures (e.g., FIGS. 1 to 11) or described above.

In the procedure of transmitting the uplink control information, the performance of the uplink signal transmitted using the coded modulation method may be limited in the case of a low signal-to-noise ratio, and how to improve the performance of the uplink signal in this case is a problem that needs to be solved.

In the procedure of transmitting the uplink control information, the performance of the uplink signal transmitted using the coded modulation method may be limited in the case of a low signal-to-noise ratio, and how to improve the performance of the uplink signal in this case is a problem that needs to be solved.

The present disclosure proposes a method for carrying information bits based on a sequenced signal, so as to solve the problem that the performance of the uplink signal transmitted using a coded modulation method may be limited in the case of a low signal-to-noise ratio. Preferably, the method proposed in the present disclosure is not only applicable to the transmission of uplink signals, but also can be adaptively applied to scenarios such as vehicle to everything (V2X) communication (for example, bypass transmission) or satellite communication transmission.

Figure 13:
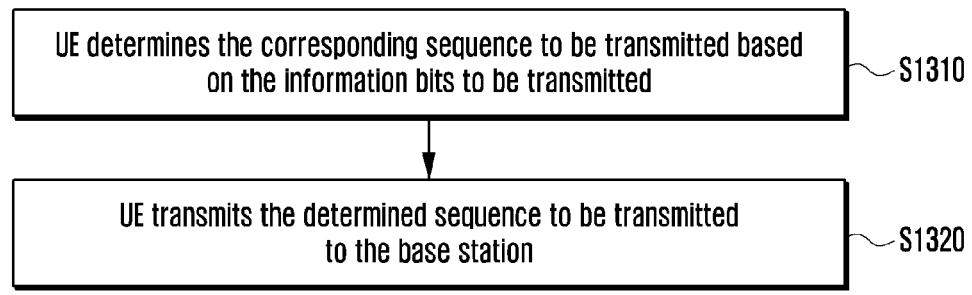
FIG. 13 illustrates an exemplary flow chart of UE transmitting a signal according to an exemplary embodiment of the present disclosure.

FIG. 13 illustrates an exemplary flowchart of a UE transmitting a signal (such as an uplink signal) according to an exemplary embodiment of the present disclosure.

In step 1310, the UE determines the corresponding sequence to be transmitted based on the information bits to be transmitted. According to an exemplary embodiment of the present application, the UE carries information, for example, N bits information through a sequence. The UE can determine the sequence carrying N bits information in the following method:

Method 1: Determine the corresponding sequence to be transmitted according to the correspondence between the information bit and the sequence. According to one embodiment, N bits of information are carried/distinguished by the sequence itself, that is, each sequence corresponds to one information bit stream. Taking N=3 as an example, $2^N=2^3=8$ sequences are needed to carry/differentiate 3 bits information. Each of the 8 sequences corresponds to a 3 bits information bit stream respectively, for example, sequence 1 corresponds to 3 bits information 000, sequence 2 corresponds to 3 bits information 001, sequence 3 corresponds to 3 bits information 010, sequence 4 corresponds to 3 bits information 011, ..., sequence 8 corresponds to 3 bits information 111, etc.; from the perspective of detecting by the receiving device (such as base station equipment), in order to determine the N bits information, $2^N$ sequences need to be detected. If the sequence 0 is detected, the 3 bits information is 000, and if the sequence 8 is detected, the 3 bits information is 111. For method 1, the sequence detection complexity of determining N bits information by the receiving device is $2^N$, that is, the detection complexity increases exponentially with the number of information bits N;

Method 2: Determine the corresponding sequence to be transmitted according to the correspondence between the information bit and the combinations of the combination of the sequence. According to one embodiment, N bits information are carried/distinguished by the combinations of the sequence, for example, two sequences are used to respectively represent one value (0 and 1) for each information bit, that is, sequence 1 represents value 0 of the information bit, and sequence 2 represents value 1 of the information bit, so a combination of N sequences 1 and/or sequences 2 can be used to represent N bits information. Take N=3 as an example, a combination of 3 sequences 1 and/or sequences 2 are used to carry/differentiate 3 bits information, such as sequence 1 sequence 1 sequence 1 corresponds to 3 bits information 000, sequence 1 sequence 1 sequence 2 corresponds to 3 bits information 001, ..., sequence 2 sequence 2 sequence 2 corresponds to the 3 bits information 111; from the perspective of detecting by the receiving device (such as base station equipment), in order to determine the N bits information, 2N (=6) sequences complexity need to be detected (for example, in order to determine the value of the first information bit, check whether the corresponding sequence is sequence 1 or sequence 2, if the corresponding sequence is sequence 1, the value of the first information bit is 0; if the corresponding sequence is sequence 2, the value of the first information bit is 1; in order to determine the value of the second information bit, check whether the corresponding sequence is sequence 1 or sequence 2; ... ; in order to determine the Nth information bit, check whether the corresponding sequence is sequence 1 or sequence 2). For the second method, the sequence detection complexity for the receiving device to determine N bits information is 2N, that is, the detection complexity increases linearly with the number of information bits N. When the value of the number of information bits N is large, the detection complexity of the second method is much lower than that of the first method.

According to one implementation, the sequence in method 1 and/or method 2 may be a sequence generated by a processor, the PAPR and correlation of which are similar to those of the ZC sequence, for example, TS 38.211 PUCCH format 0 Sequence; or the sequence is generated from the ZC sequence. In addition, the sequence may also be an M sequence, a Gold sequence, etc., or a combination of multiple sequences.

According to one implementation, the sequences 1, 2, 3, ... 8 in the method 1 and/or method 2 may be different root sequences, and/or different cyclic shift versions of the same root sequence.

According to one preferred implementation, the length of the sequence in method 1 and/or method 2 can be determined by at least one of the followings methods:

The length of the sequence is a preset fixed value;

The length of the sequence is configured differently according to different categories, and the categories can be a combination of one or more of the followings:

The format of the signal to be transmitted, such as PUCCH format;

The number of information bits, for example, for 1~2 information bits, the first length sequence is used; for 3~11 information bits, the second length sequence is used; and for more than 11 information bits, the third length sequence is used;

The length of the sequence is configured by the base station, such as semi-statically or dynamically configured by the base station. For example, the UE determines the sequence length through downlink control information (DCI) or radio resource control (RRC) signaling transmitted by the base station;

The length of the sequence is determined by the UE through the time-frequency resources configured by the base station. For example, the UE may determine the sequence length through at least one of the followings time-frequency resources configured by the base station:

The number of time units in the time domain,

The number of frequency domain units in the frequency domain,

The number of resource elements (resource element, RE)

According to one preferred implementation, the length of the sequence is determined by performing a value evaluation operation on the number of the above-mentioned time-frequency resources. For example, according to one embodiment, the maximum prime number that is not greater than (or less than) the number of time-frequency resources is taken as the length of the sequence. Taking frequency domain units (such as subcarriers) as an example, assuming that the number of subcarriers is 144, the value of the length of the sequence is the maximum prime number 139 that is not greater than 144.

According to one preferred implementation, when more sequences are needed to transmit signals in method 1, a longer sequence can be used; while in method 2, because information bits needed to carried in a single sequence is not many, a shorter sequence can be used. However, the shorter sequence is not as good as the longer sequence in terms of orthogonality, so the repeated transmission sequence method can be used to increase the performance of the short sequence. In addition, the sequence in method 1 can also be transmitted repeatedly to improve the performance of the sequence. That is, the combination of the sequence composed of the sequence to be transmitted determined in method 1 and/or the sequence to be transmitted determined in method 2 includes repetition of at least one sequence to be transmitted. For the repeated transmission of the at least one sequence to be transmitted, the number of repeated transmissions may be configured by the base station, and/or may be determined based on the size of the time-frequency resource configured by the base station (for example, the number of time domain units) N and/or the number M of the sequence to be transmitted, such as N/M. According to a preferred embodiment, N/M can be rounded up or down to determine the number of repeated transmissions. For the repeated transmission position of at least one sequence to be transmitted, consecutive repeated transmission and/or interlaced repeated transmission may be adopted.

Figure 14:
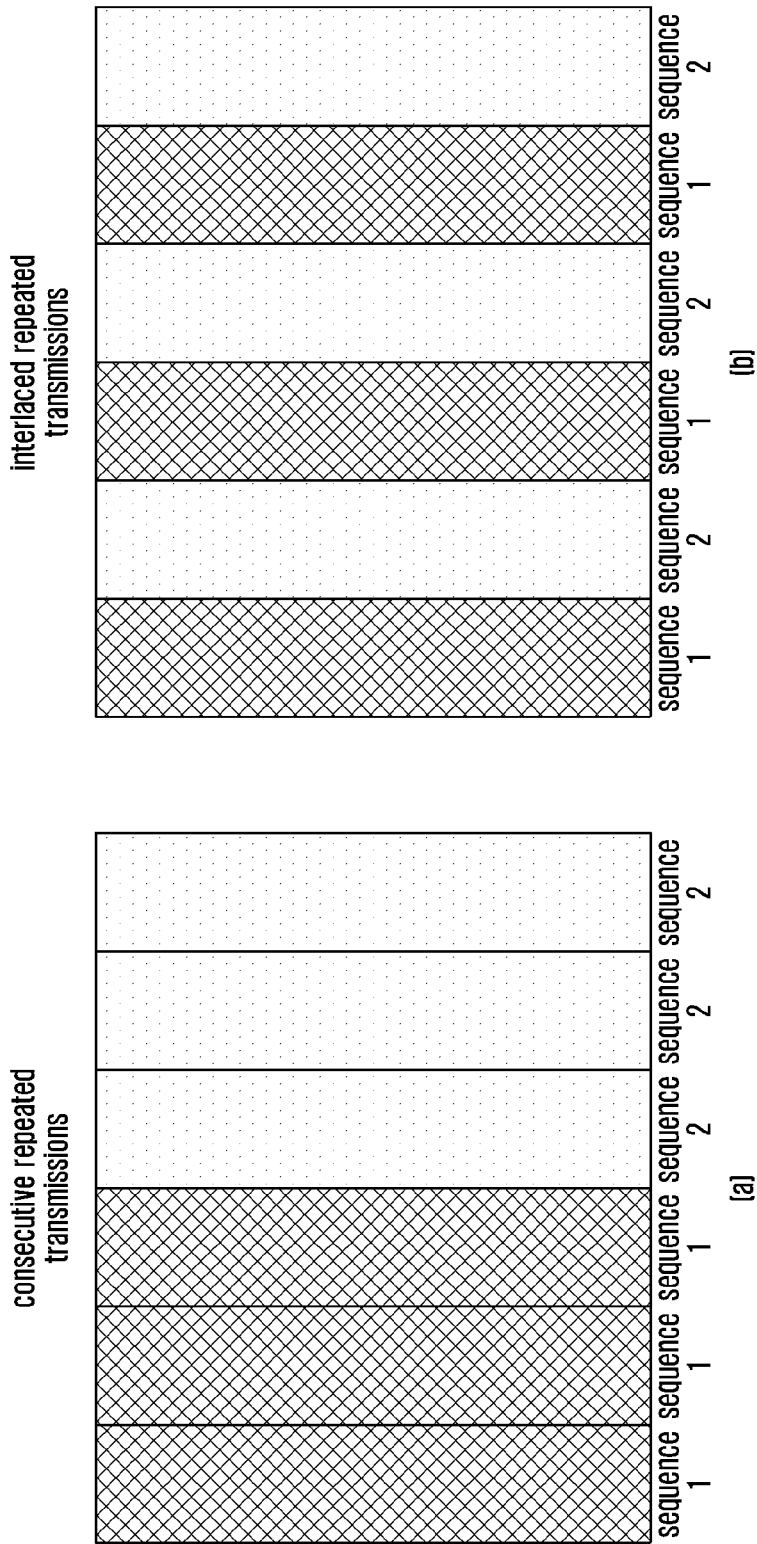
FIG. 14 illustrates the positions of consecutive repeated transmissions and repetitions of interlaced repeated transmissions.

FIG. 14 illustrates the positions of consecutive repeated transmissions and repetitions of interlaced repeated transmissions.

For example, in FIG. 14(a), there is a need to transmit sequence 1 and sequence 2 and to repeat 3 times for each of sequence 1 and sequence 2. For consecutive repeated transmission, it is transmitted in the manner of sequence 1, sequence 1, sequence 1, sequence 2, sequence 2, sequence 2 and sequence 2; in FIG. 14(b), for the interlaced repeated transmission, it is transmitted in the manner of sequence 1, sequence 2, sequence 1, sequence 2, sequence 1 and sequence 2.

The UE determines to adopt a consecutive and/or interlaced repetitive transmission mode through the DCI or RRC signaling scheduling configuration transmitted by the base station equipment.

Returning to FIG. 13, in step 1330, the UE transmits the determined sequence to be transmitted to the base station. According to the above implementation of the present application, even in the case of a low signal-to-noise ratio, the performance of a signal (such as an uplink signal) can be improved.

In an OFDM-based system, when a UE transmits an uplink signal on a given resource, it needs to ensure that the interference caused by the uplink signal transmitted by itself on other uplink signals transmitted on adjacent resources does not exceed certain extent, so power backoff may be performed. For example, the UE obtains the power P1 to be used for transmitting the uplink signal through the configuration information, but to meet the condition that the interference is not too large, the power P1 should be reduced by a certain amount of delta, that is, the actual transmission power is P1-delta. The actual transmission power is reduced, which will have a great impact on the signal transmission quality in a scenario with limited coverage.

Therefore, the exemplary embodiment of the present disclosure proposes an uplink signal transmission method, which can preferentially map the actual data signal to be transmitted to the middle part of the configured resource (for example, the configured frequency band), so the interference that the transmitted data signal suffered from both sides of the configured frequency band and the interference to other signals on adjacent resources can be reduced, without reducing actual transmission power.

Figure 15:
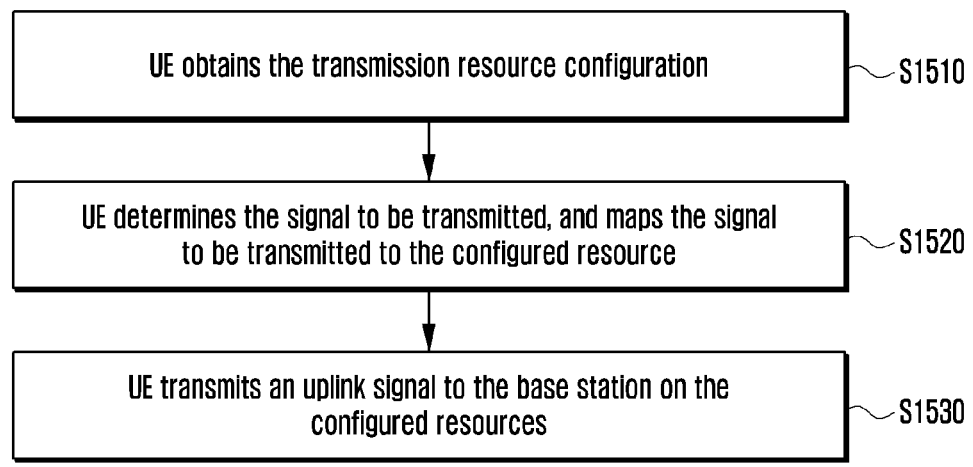
FIG. 15 illustrates a signal transmission method according to an exemplary embodiment of the present disclosure.

FIG. 15 illustrates a signal (such as an uplink signal) transmission method according to an exemplary embodiment of the present disclosure.

In step S1510, the UE obtains the transmission resource configuration. For example, the UE determines the transmission resource configuration to be used for transmitting uplink signals through the configuration information provided by the base station.

In step S1520, the UE determines the signal to be transmitted, and maps the signal to be transmitted to the configured resource. According to one embodiment, the UE preferentially maps the data signal to be transmitted to the middle part of the resource (for example, the configured frequency band) configured by the base station. According to one implementation, the UE may implement the operation in step S1402 by: offsetting the start position of the frequency domain by a predetermined offset (koffset) frequency domain units when the UE determines/generate the OFDM symbol; and/or offsetting the start position of the mapped frequency domain by a predetermined offset (koffset) when the UE maps the resources.

According to one embodiment, when the UE determines/generates an OFDM symbol, the start position of the frequency domain is offset by a predetermined offset (koffset) frequency domain units, wherein the frequency domain units may be, for example, but not limited to, subcarriers. Hereinafter, subcarriers are taken as an example for description.

Wherein, the time-domain consecutive signal $s_l^{(p,\mu)}(t)$ is the OFDM symbol at the antenna port p and with the sub-carrier spacing being $\mu$, wherein $l \in \{0, 1, \ldots, N_{slot}^{subframe,\mu} N_{symb}^{slot}-1\}$ is $$s_l^{(p,\mu)}(t) = \begin{cases} \bar{s}_l^{(p,\mu)}(t) & t_{start,l}^{\mu} \le t < t_{start,l}^{\mu} + T_{symb,l}^{\mu} \\ 0 & \text{otherwise} \end{cases}$$

$$\bar{s}_l^{(p,\mu)}(t) = \sum_{k=0}^{N_{grid,x}^{size,\mu} N_{sc}^{RB}-1} a_{k,l}^{(p,\mu)} e^{j2\pi \left(k+k_0^{\mu}-N_{grid,x}^{size,\mu} N_{sc}^{RB}/2 + k_{offset}\right) \Delta f \left(t - N_{CP,l}^{\mu} T_c - t_{start,l}^{\mu}\right)}$$

Compared with the formula for generating time-domain consecutive signal $s_l^{(p,\mu)}(t)$ in TS38.211, offset $k_{offset}$ is added, other parameters in the formula have the same meaning, for example, f is used to determine the sub-carrier spacing;

$\mu$ is the subcarrier spacing configuration;

$-\mu_0$ the maximum $\mu$ value in the subcarrier spacing configuration of the high layer parameter scs-SpecificCarrierList;

$N_{grid,x}^{size,\mu}$ represents the size of the resource grid;

$N_{sc}^{RB}$ represents the number of subcarriers in each resource block.

Figure 16:
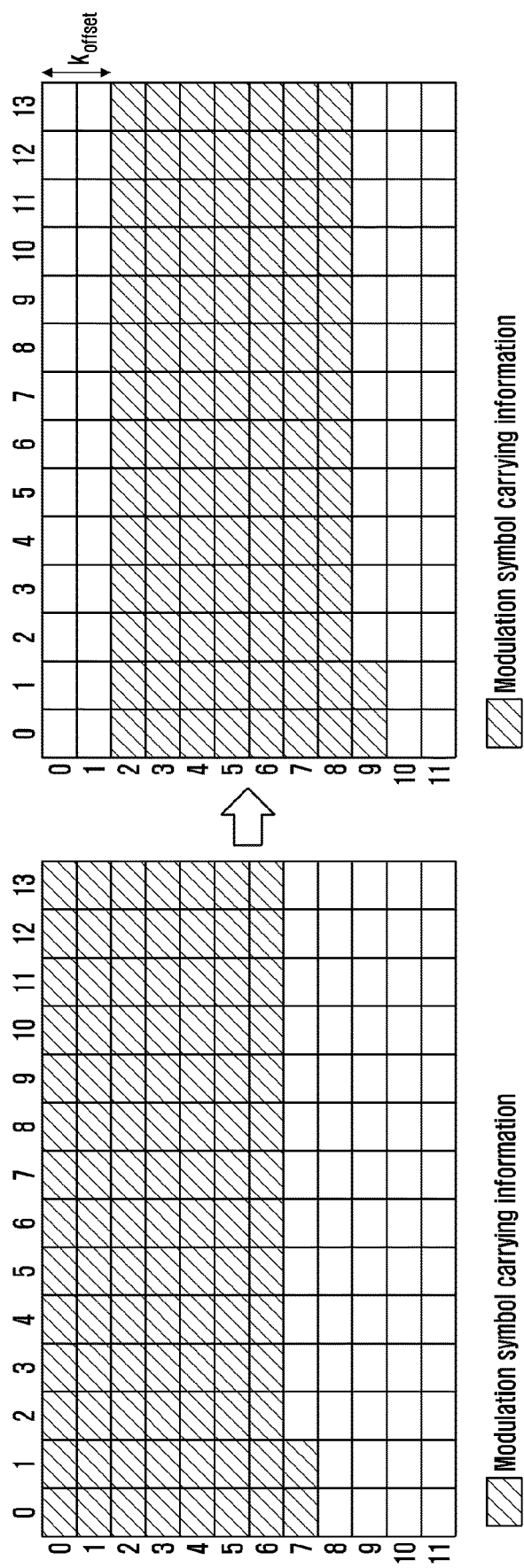
FIG. 16 illustrates a schematic diagram of offsetting the start position of the frequency domain by a predetermined offset when the UE determines/generates the OFDM symbol.

FIG. 16 illustrates a schematic diagram of offsetting the start position of the frequency domain by a predetermined offset when the UE determines/generates the OFDM symbol.

To simplify the description, in FIG. 16, one PRB is taken as an example (14 OFDM symbols, 12 subcarriers) for description. As shown in FIG. 16, in the left figure, when generating OFDM symbols, the start position of the modulation symbol in the frequency domain is the first subcarrier (index 0); the right figure illustrates the method according to the present disclosure, when generating OFDM symbols, the start position of the modulation symbol in the frequency domain is offset from the first subcarrier (index 0) by a predetermined offset, that is, koffset subcarriers;

According to one embodiment, when the UE maps resources, the start position of the mapping in the frequency domain is offset by a predetermined offset koffset by one or more of the following methods:

In the case of mapping from complex symbols to virtual resources: when mapping the generated complex symbols to the allocated virtual physical resources, the mapping starts from k' in the frequency domain, where k'=koffset−1 is the koffset-th subcarrier on the virtual resource block with the smallest index among the allocated virtual physical resource; the allocated virtual physical resource is completed in the manner described in TS38.214; and/or In the case of mapping physical resources from virtual resources: when mapping the generated virtual resource block n' to the actual physical resource block n, wherein, n'=n+koffset; at this time, koffset may be the granularity of the physical resource block.

The predetermined offset koffset in the above implementation may be determined by one or more of the following methods:

The UE determines koffset by calculation. According to one embodiment, the UE can calculate koffset by the following formula: koffset=(N_re−N_ms) or (N_re−N_ms)/2 or [(N_re−N_ms)] or [(N_re−N_ms)/2], wherein N_re represents the time-frequency resource allocated to the user for transmission; N_ms represents the time-frequency resource actually occupied by the user, that is, the time-frequency resource expected to be occupied by the data to be transmitted; wherein the size of the time-frequency resource includes the size of the time domain unit, and/or the size of the frequency domain unit, and/or the size of the resource element; where [X] is the rounding operation of X, which can be rounded up or rounded down; and/or The UE determines koffset through the configuration of the base station. According to one embodiment, the base station directly configures the offset koffset that the UE needs to use through DCI or RRC signaling, and the UE determines koffset through DCI or RRC signaling configured by the base station.

According to an embodiment, among the configured time-frequency resource, except for the modulation symbol carrying the information which is to be transmitted, what on the other time-frequency resources are: modulation symbols all of which are supplemented, and/or symbols all of which are blank, and/or modulation symbols which are partially supplemented.

Figure 17:
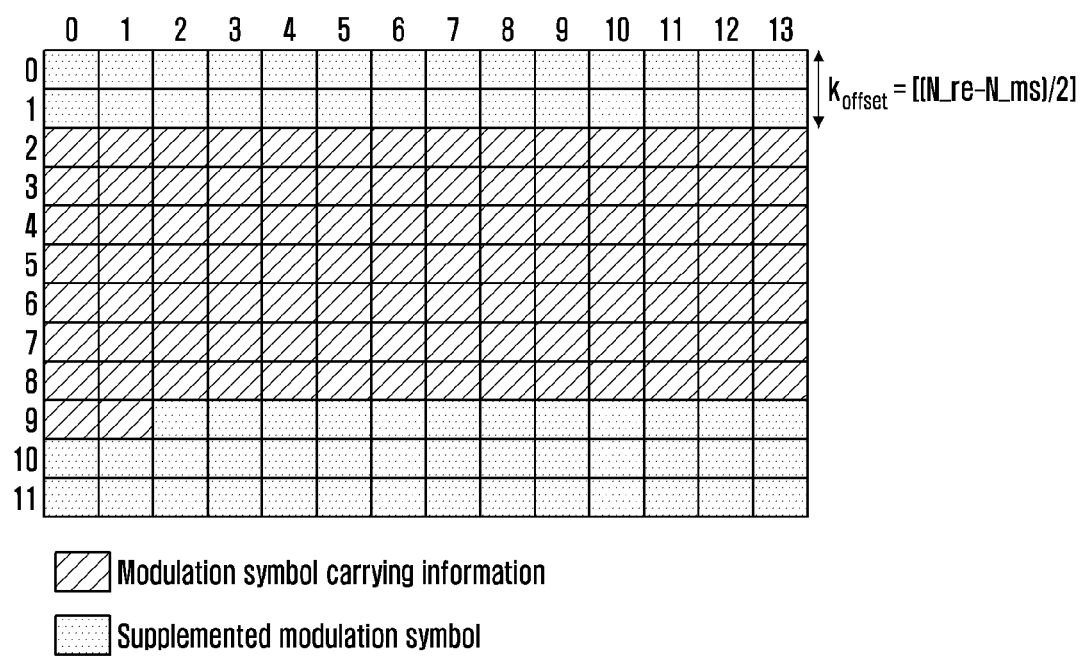
FIG. 17 illustrates an example in which the modulation symbols on the other time-frequency are all supplemented.

FIG. 17 illustrates an example in which the modulation symbols on the other time-frequency are all supplemented.

As shown in FIG. 17, among the configured time-frequency resource, except for the modulation symbols carrying information which is needed to be transmitted, the modulation symbols on the other time-frequency are all supplemented, that is, padded with random bits, or padded with all 0 bits or all 1 bit modulation.

Figure 18:
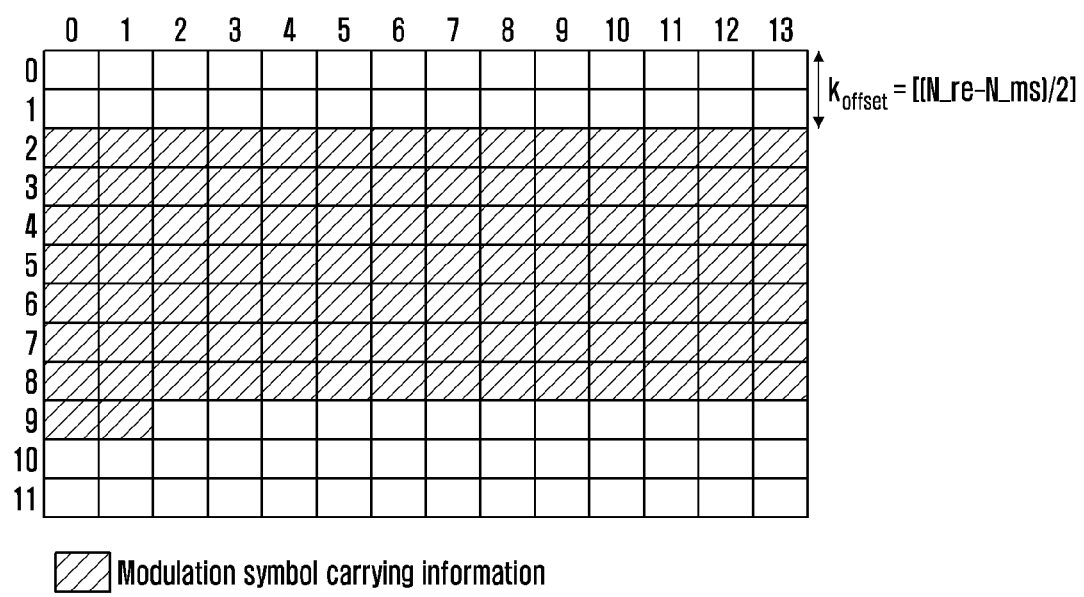
FIG. 18 illustrates an example in which the symbols on the other time-frequency are all blank.

FIG. 18 illustrates an example in which the symbols on the other time-frequency are all blank.

As shown in FIG. 18, among the configured time-frequency resources, except for the modulation symbols carrying information which is needed to be transmitted, the symbols on the other time-frequency are all blank, that is, all are 0.

Figure 19:
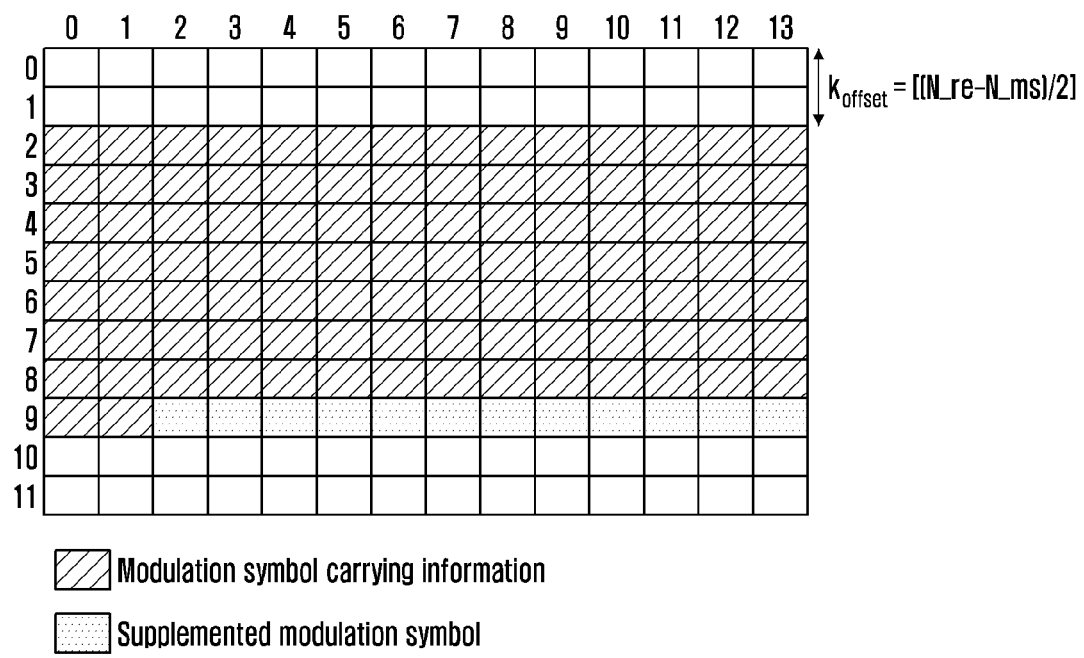
FIG. 19 illustrates an example in which the modulation symbols on the other time-frequency are partially supplemented.

FIG. 19 illustrates an example in which the modulation symbols on the other time-frequency are partially supplemented.

As shown in FIG. 19, among the configured time-frequency resources, except for the modulation symbols carrying information which is needed to be transmitted, the modulation symbols on the other time-frequency are partially supplemented, so as to fill out the frequency domain resources, fill out the time domain resources, and/or fill out both time domain and frequency domain resources.

Returning to FIG. 15, in step S1530, the UE transmits an uplink signal to the base station on the configured resources. According to the method proposed in the present disclosure, by preferentially mapping the actual data signal to be transmitted to the middle part of the configured resource by UE, the interference that the transmitted data signal suffered from both sides of the configured frequency band and the interference to other signals on adjacent resources can be reduced, without reducing actual transmission power.

In addition, during the initial access procedure, the UE may lack timely channel feedback, which may cause the base station equipment unable to provide accurate scheduling information to the UE. Therefore, an exemplary embodiment of the present disclosure provides a method that enables the UE to perform measurement and feedback of channel state during the initial access.

Figure 20:
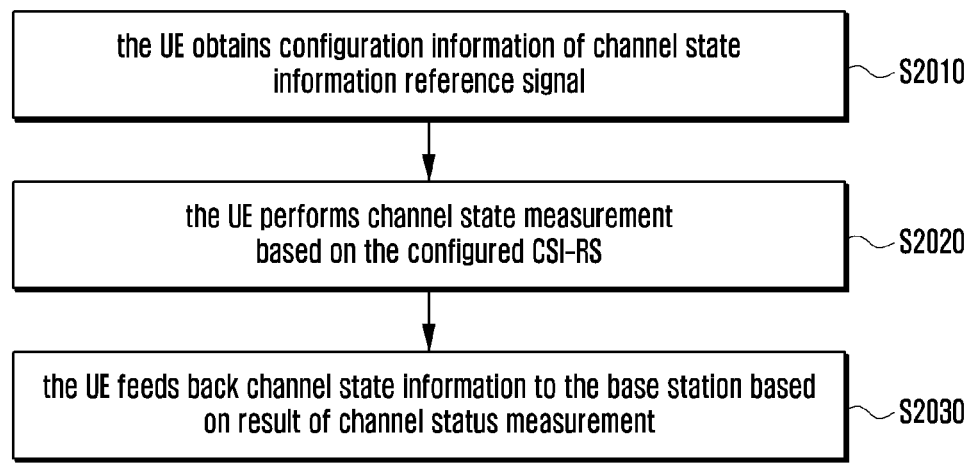
FIG. 20 illustrates a channel feedback method according to an exemplary embodiment of the present application.

FIG. 20 illustrates a channel feedback method according to an exemplary embodiment of the present application.

In step S2010, the UE obtains configuration information of channel state information reference signal (CSI-RS). The UE may use the SSB resource configured by the base station as the configured CSI-RS, and/or the UE may obtain specific (for example, specially configured by the base station) CSI-RS configuration information. In the case of the CSI-RS specially configured by the base station, a total of N CSI-RS signals are configured, and wherein each SSB is configured with N CSI-RS signals; that is, the UE that selects a certain SSB will measure the corresponding CSI-RS signal.

In step S2010, the UE may obtain configuration information of CSI-RS from RRC signaling (such as system information) and/or from DCI and/or RAR, so as to obtain PUCCH time-frequency resources and/or configuration information of the sequence for channel state information feedback.

According to one implementation, the configuration information may include a measurement period, where the measurement period may be the same as the transmission period of the SSB; and/or the measurement period may be a time period separately configured by the base station.

In step S2020, the UE performs channel state measurement based on the configured CSI-RS. According to one implementation, the UE directly measures the configured CSI-RS. According to another implementation, the UE measures the SSB, selects the SSB (for example, selects one of the SSBs greater than a certain threshold, or selects the strongest SSB), and performs measurement by the selected SSB determining the contacted (mapped) CSI-RS.

In step S2030, the UE feeds back channel state information to the base station based on the channel state measurement result. According to one implementation, the channel state information fed back by the UE includes one or a combination of the followings:

Precoding matrix indicator PMI, rank indicator RI, channel quality indicator CQI;

The reference signal received power RSRP or the reference signal received quality RSRQ including the downlink measurement; and/or The CSI-RS index value including measure with the largest (for example, the largest RSRP).

Wherein, for the RSRP or RSRQ measured with respect to downlink, according to one implementation, a reference value is used as a reference, and the difference between the measured RSRP or RSRQ and the reference value is fed back; wherein, a reference value may be a value preset by the base station or a fixed value, and/or may be the downlink measurement value of the first CSI-RS (then the downlink measurement value of the first CSI-RS may need to be included at this time).

In step S2030, the UE may feed back channel state information to the base station through PUCCH feedback and/or through random access message 3 feedback.

In the case of feedback through PUCCH, the UE obtains configuration information of PUCCH from RRC signaling (e.g. system information) or DCI or RAR, so as to obtain the PUCCH time-frequency resource or configuration information of sequence for feedback; DCI can be PDCCH for scheduling RAR, or PDCCH for scheduling retransmission of message 3, or the dedicated PDCCH. According to a preferred embodiment, the UE may feed back channel state information on the PUCCH resource after one reference time, and the one reference time may be:

The end position of the last CSI-RS of the CSI-RS period; or

The end position of the last downlink time domain unit of the CSI-RS period; or

The end position of the PDSCH of the RAR carrying the PUCCH configuration resource; or The end position of the downlink time domain unit where the PDSCH of the RAR carrying the PUCCH configuration resource is located; or The end position of the PDCCH carrying the PUCCH configuration resource; or The end position of the downlink time domain unit where the PDCCH carrying the PUCCH configuration resource is located.

In the case of feedback through message 3 of random access, the UE performs feedback by carrying state information fed back MAC CE on PUSCH in the message 3 of random access; and/or adding the UCI portion to the PUSCH in the message 3, wherein the UCI portion and the PUSCH are separately coded.

According to the exemplary embodiments of the present disclosure, the UE can perform channel state measurement and feedback during the initial access procedure, thereby providing timely channel feedback to the base station, so that the base station device can provide the UE with accurate scheduling information.

At least one method corresponding to the above embodiments of the present disclosure and the combination thereof may be performed by a user equipment, such as the user equipment UE 116 in FIG. 3A. For example, the memory 360 of the UE 116 stores computer-executable instructions thereon, and the instructions when being executed by the processor 340, performs at least one method corresponding to the foregoing embodiments of the present disclosure.

In the method for positioning, e.g. in the enhanced cell ID (E-cell ID) method, the user may need to report the timing advance value, the arrival angle of the signal, etc., and random access may need to be triggered to obtain the timing advance value. In addition, the random access preamble signal itself can also be used to calculate the positioning information; therefore, in the case of using random access for positioning, considering the higher accuracy and lower delay required by positioning, how to optimize the current random access procedure for positioning is a problem that needs to be solved.

According to the embodiments of the present disclosure, there is provided a method and device for positioning based on random access In the method for positioning based on random access proposed in the present disclosure, the UE obtains related configuration information for positioning through higher layer signaling (such as system information and/or UE-specific RRC configuration information) and/or physical layer signaling (such as downlink control information), specifically, includes one or more of the followings:

(I) Obtaining the power configuration for positioning, and the specific method thereof includes at least one of the followings:
(1) Obtaining the target received power indication for positioning, P_target_received_power_positioning;
(2) Obtaining the target received power offset for positioning, P_offset_positioning, based on target received power of random access, P_target_received_power, then the target received power for positioning P_target_received_power_positioning can be obtained by P_target_received power+P_offset_positioning;
(3) Preferably, when in the RRC connected state (RRC_CONNECTED), the UE can obtain the target received power for positioning according to the power setting of the last successful uplink signal transmission.

(II) Obtaining the random access resource configuration for positioning, and the specific content and method thereof include at least one of the followings:
(1) Random access occasion (PRACH occasion, RO) for positioning, which can correspond to a random access occasion index for a period of time; preferably, the random access occasion index is used to indicate that one or more downlink beams mapped to the random access occasions within the period of time among one or more downlink beams (for example, SSB and/or CSI-RS); the period of time may be one of the followings:

random access configuration period;

downlink beam to random access resource mapping cycle;

downlink beam to random access resource association period;

downlink beam to random access resource association pattern period;

wherein, the method for obtaining the random access occasion index may be:

a) Direct bitmap indication, for example, there are 8 ROs in total, and an 8-bit bitmap is used to indicate that one or more random access occasions are suitable for positioning transmission;

b) Through a table lookup, e.g. a 16-row table, each row can indicate a configuration of random access occasions (e.g. one specific random access index value, or even number, odd number, or all of the random access index value), and the configuration of one of the 16 rows can be indicated by 4 bits.

(2) Random access preamble configuration for positioning, the specific content and method thereof include at least one of the followings:

a) Dedicated preamble index for positioning, indicated by a separate bit field;

b) Randomly select a preamble with equal probability from the preamble resource pool for positioning.

(3) The configuration period of the random access resource for positioning, the specific content and method thereof include at least one of the followings:

a) Configuring a separate random access configuration period for positioning (PRACH configuration period for positioning);

b) Configuring scaling factor or offset on the normal random access configuration period (PRACH configuration period) to obtain the random access configuration period for positioning;

(4) The transmit beam configuration of the random access preamble for positioning, the specific content and method thereof include at least one of the followings:

a) transmitting a beam index indication, for example, when a UE is in a connected state, the base station obtains the beam condition of the UE (such as the best beam, etc.) by measuring the SRS (sounding reference signal) transmitted by the UE, can notify the UE to use the beam corresponding to the configured SRI (SRS resource index) to transmit the random access preamble for positioning by configuring SRI; or the configured downlink beam index, the UE uses the transmit beam corresponding to the receive beam receiving the configured downlink beam index to transmit random access preamble for positioning;

b) Based on the UE's own implementation, determining the transmit beam transmitting the random access preamble for positioning;

c) transmitting the random access preamble for positioning by using the transmit beam used in the last (successful) uplink transmission (such as PUSCH, PUCCH, PRACH, SRS, etc.)

Figure 21:
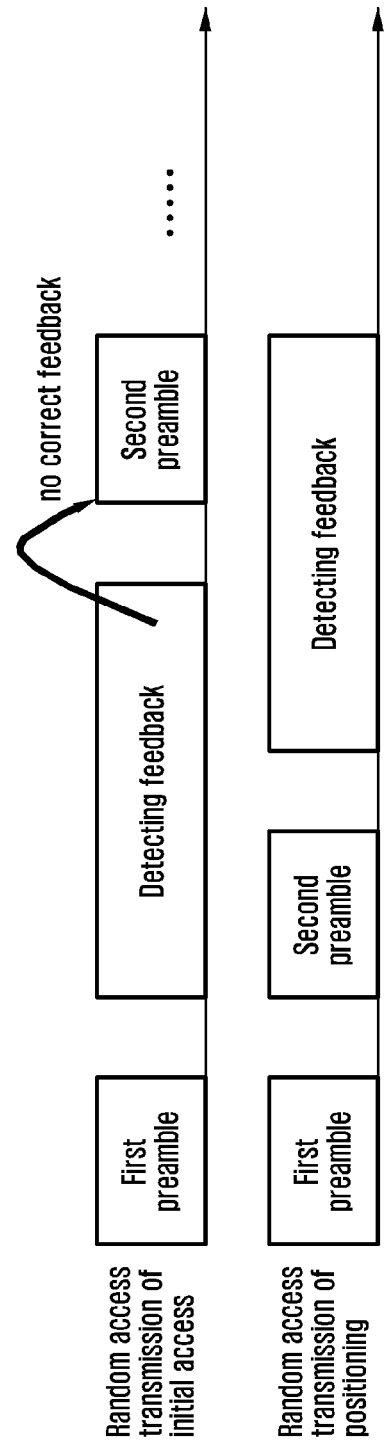
FIG. 21 illustrates an example diagram of preamble transmission.

According to the embodiments of the present disclosure, after the UE determines the available and valid random access resources, the UE can select a random access occasion to transmit the random access preamble; when the UE does not detect the feedback from the base station or does not detect the correct feedback, the UE may need to retransmit the random access preamble. In particular, in the transmission of random access preambles for positioning, the UE may transmit multiple random access preambles in one transmission. FIG. 21 illustrates an example diagram of preamble transmission. As shown in FIG. 21, with respect to the preamble transmission for random access, the second preamble transmission needs to be transmitted after that no correct feedback follows the detecting of the feedback; in the random access transmission for positioning, multiple preambles can be transmitted in one transmission.

Figure 22:
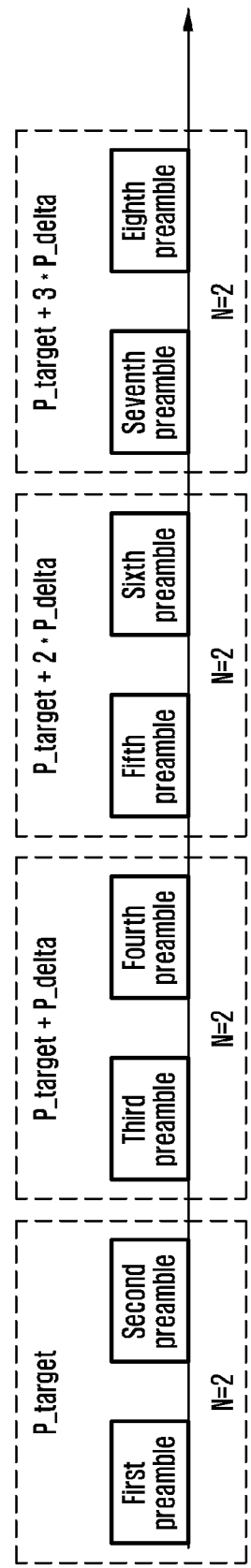
FIG. 22 illustrates an example diagram of a power ramping up operation.
Figure 23:
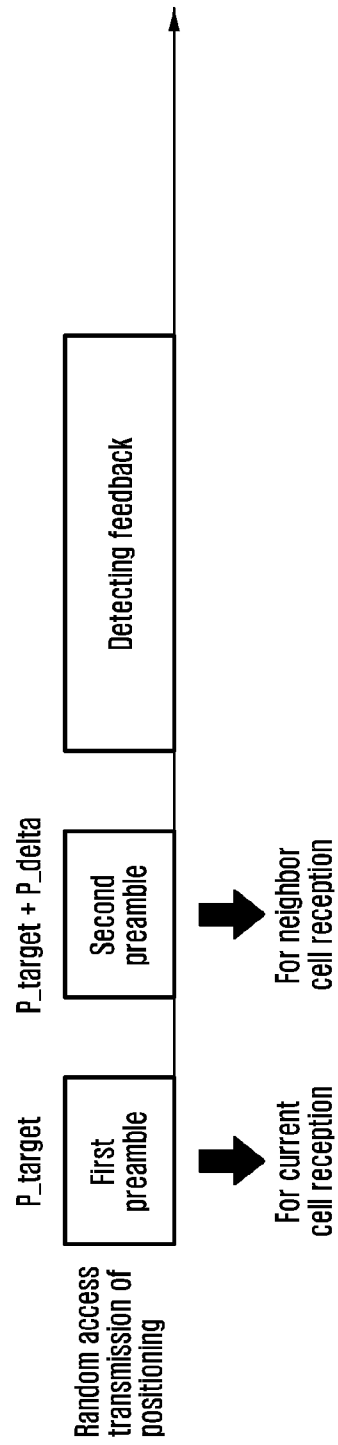
FIG. 23 illustrates another example diagram of a power ramping up operation.

In the procedure of transmitting these multiple preambles, the UE may perform one or more of the following operations:

(I) Power ramping up operation, the specific method thereof includes at least one of the followings:
(1) power ramping up operation is not performed for multiple preambles, that is, the target received power of multiple preambles is the same; in particular, power ramping up operation is not performed when the number of multiple preambles transmission is within a certain number of times N, the certain number of times N can be configured by the base station or pre-defined (fixed); that is, when the number of preambles transmitted exceeds a positive integer multiple of N, the power ramps up once, and the magnitude of the power for each ramping up (P_delta) is configured by the base station or pre-defined. FIG. 22 illustrates an example diagram of the power ramping up operation. As shown in FIG. 22, when N=2, the target received power of the first two preambles is P_target; the target received power of the third and fourth preambles is P_target+P_delta; and so on, until it reaches the maximum value.
(2) Preferably, power ramping up is sequentially performed for the multiple preambles transmission is, especially for the multiple preambles transmission for positioning, because the purpose of multiple preamble transmissions can allow neighbor cells (or transmitter receiver point TRP) to better receive the transmitted preamble. FIG. 23 illustrates another example diagram of the power ramping up operation. As shown in FIG. 23, the UE transmits two preambles (before the detection feedback is completed), and compared with the first preamble, the power for the second preamble is ramped up (increased by P_delta, in particular, P_delta here can be the power ramping up value that is exclusively configured for the preamble transmission for positioning, or the power ramping up value configured during initial access can be reused).

(II) Transmit beam determination operation, the specific method thereof can have at least one of the followings:
(1) The UE receives indication from the base station, and transmits multiple preambles according to the indicated beam; for example, if the UE wants to transmit two preambles, the UE obtains the beam configuration information for transmitting these two preambles from the configuration from the base station; the possible forms of the specific beam configuration information have been described above, and will not be repeated here. When the preamble for positioning is transmitted, some preambles are targeted for reception in neighbor cells. If the transmission beam used by the UE is not suitable, it is prone to cause the reception failure in the neighbor cells; it will affect the reception performance and also affect positioning accuracy. According to the embodiments of the present disclosure, the above-mentioned disadvantage can be avoided, and the positioning accuracy is improved.
(2) determining the transmit beam for transmitting the random access preamble for positioning based on UE's own implementation; in particular, each random access preamble is determined individually, or transmitting all the preamble in this transmission according to the beam determined for the first preamble; that is, the beam is only determined once and then the same beam is used for all transmissions.

(III) Preamble transmission termination operation, the specific method thereof includes at least one of the followings:
(1) When the transmitted preamble reaches the maximum number of times set by the base station, the transmission of the preamble is terminated;
(2) When the random access process in progress reaches the maximum allowable time set by the base station, the transmission of the preamble is terminated;
(3) Preferably, in the above two methods, the UE does not need to perform the procedure of receiving feedback from the base station in the regular random access procedure, that is, the UE only needs to transmit the preamble and does not need to perform random access feedback detection and reception;
(4) Preferably, the UE performs random access feedback detection, and obtains an indication for terminating transmission in the feedback indication; the indication for terminating transmission may be carried in the PDCCH or carried in the random access response in the PDSCH; wherein the indication for terminating the transmission may be at least one of the followings:
(A) Indication bit field for terminating transmission;
(B) Through correctly receiving feedback (such as matched RA-RNTI, matched RAPID, matched UE ID, etc.), the UE can determine the indication that the preamble transmission can be terminated.

Figure 24:
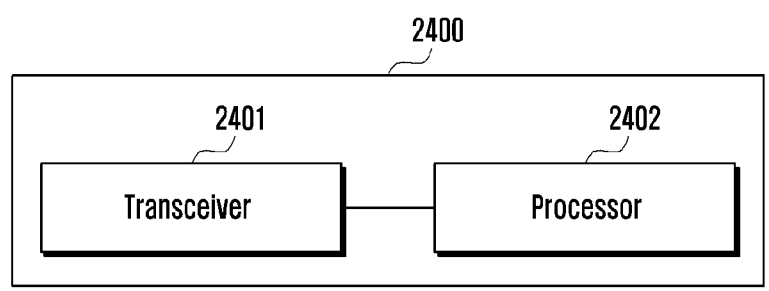
FIG. 24 illustrates a device for performing a positioning method based on random access according to the present disclosure.

This embodiment also provides a device 2400 for performing a positioning method based on random access. FIG. 24 illustrates a device for performing a positioning method based on random access according to the present disclosure. The device 2400 includes a transceiver 2401 and a processor 2402, wherein the transceiver 2401 is configured to transmit and receive signals to and from the outside, and the processor 2402 uses higher layer signaling or physical layer signaling received by the transceiver 2401 to obtain related configuration information for positioning.

The present disclosure also provides a computer-readable medium having computer-executable instructions stored thereon, the instructions when being executed, performs any method described in the embodiments of the present disclosure.

The present disclosure also proposes an angle estimation method based on the differential beam, which is finally used in the calculation of positioning information. The basic principle of the differential beam is: the transmitting end uses a normal beam and a differential beam to transmit the same signal, and the receiving end uses the same receiving beam (or no receiving beam) for reception. In this case, the method provided in the present disclosure is used to estimate the angle of departure for downlink (DL-AOD). Or the transmitting end uses the same transmitting beam to transmit a signal (or multiple identical signals), and the receiving end uses a normal beam for reception. In this case, the method provided in the present disclosure is used to estimate the angle of arrival for uplink (UL-AOA). in both methods, the received signal is divide thereby resulting in a ratio. Through the relationship between this ratio and the angle difference, the corresponding angle difference can be obtained. The angle difference is the angle difference between the beam direction and the direction from the transmitting end to the receiving end, and the beam direction is known, so the angle of the direction from the transmitting end to the receiving end can be obtained based on the obtained angle difference.

In the differential-based DL-AOD method, the operations performed by the transmitting end and the receiving end may include one or more of the followings:

The transmitting end (taking base station equipment as an example) uses normal beams and differential beams to transmit downlink positioning signals;

The receiving end (taking the user equipment as an example) obtains the resource configuration information of the downlink positioning signal, including at least one of the followings therein:

The time-frequency resource configuration of the downlink positioning signal (for example, at least one of the followings: the size and number of time domain units, the start position in one slot, slot level offset, the reference point of the offset value, and the size and number of frequency domain units in the frequency domain);

The configuration period of the downlink positioning signal;

The beam configuration information of the downlink positioning signal, specifically includes at least one of the followings:

The association relationship between the downlink positioning signal and the downlink beam (for example, SSB, CSI-RS), that is, the UE can determine that the received downlink positioning signal is associated with one SSB downlink beam;

The activation indication of differential beam transmission, that is, through which, the UE can determine that the received signal is transmitted by the normal beam and the differential beam;

The receiving end receives the downlink positioning signal and feeds back the result of the received measurement; the specific operation thereof can include at least one of the followings:

The UE feeds back the received value y_norm of the signal transmitted using the normal beam to the base station; in particular, the UE does not need to distinguish the signal using the normal beam or the differential beam, and feeds back the received value of the corresponding downlink positioning signal through the obtained base station configuration, e.g. PRS1 and the corresponding Y1;

The UE feeds back the received value y_diff of the signal transmitted using the differential beam to the base station; in particular, the UE does not need to distinguish the signal using the normal beam or the differential beam, and feeds back the received value of the corresponding downlink positioning signal through the obtained base station configuration, e.g. PRS2 and the corresponding Y2;

The UE feeds back the obtained ratio of y_norm to y_diff to the base station (wherein it can be y_norm/Y_diff or y_diff/Y_norm);

In particular, the UE does not need to determine whether a normal beam or differential beam transmission is used in the downlink positioning signal, and it is sufficient for the UE to feed back to the base station the ratio obtained by the division between the corresponding received signal 1, Y1 and the corresponding received signal 2, based on the indication obtained from the base station; in this way, the UE can save calculation overhead and configuration signaling overhead, and the base station performs calculation and/or comparison to obtain the angle deviation value;

Based on the obtained ratio of y_norm to y_diff, with the relationship between the determined ratio and the angle deviation (by looking up value through the table with one-to-one correspondence, that is, one ratio corresponds to one angle value, or through the calculation based on the formula), the UE obtained the angle deviation corresponding to the ratio and feedback the angle deviation value to the base station;

Wherein, the table with one-to-one correspondence and/or formula for calculation are obtained by the UE from the network configuration, or predefined;

In the differential-based UL-AOA method, the operations performed by the transmitting end and the receiving end may include one or more of the following:

The transmitting end (taking UE as an example), or the resource configuration information of the uplink positioning signal, uses a normal beam to transmit the uplink positioning signal (such as SRS and SRS-pos for positioning), wherein the resource configuration information of the uplink positioning signal includes at least one of the followings:

The time-frequency resource configuration of the uplink positioning signal (for example, at least one of the followings: the size and number of time domain units, the start position in a slot, a slot level offset, the reference point of the offset value, and the size and number of frequency domain units in the frequency domain);

The configuration period of the uplink positioning signal;

The sequence generation index of the uplink positioning signal, used to determine the sequence signal generation in the uplink positioning signal;

The beam configuration information of the uplink positioning signal specifically includes at least one of the followings:

The transmit beam of the uplink positioning signal uses the uplink transmit beam corresponding to the downlink receive beam that receives the configured downlink signal (such as SSB, CSI-RS). For example, if SSB1 is configured to the UE, the UE uses uplink transmit beam corresponding to the receive beam that receives SSB 1 to transmit uplink positioning signal;

The transmission beam of the uplink positioning signal uses the uplink beam corresponding to the configured sounding reference signal index to transmit the uplink positioning signal. For example, the UE obtains the configured SRI 1, and then uses the same uplink transmit beam as the SRI 1 to transmit the uplink positioning signal;

The transmit beam of the uplink positioning signal uses the same uplink beam used in the last (successful) uplink transmission (such as PRACH, PUSCH, PUCCH, etc.);

The transmit beam of the uplink positioning signal is determined by the UE implementation;

The power configuration information of the uplink positioning signal includes at least one of the followings:

Target received power;

Path loss compensation factor;

Power ramping up step size P_step; similar to the power ramping up operation of the preamble in the above embodiment, within a certain time range (for example, one configuration period of an uplink positioning signal), there may be multiple transmission occasions for uplink positioning signal, then start from the first occasion, after every N uplink positioning signals, the power increases by one power ramping up step. For example, in one configuration period of 10 ms, there are 6 SRS-pos transmission occasions, N=2, then after every 2 SRS-pos, the power increases P_step; That is, the power of the first and second SRS-pos is P, the power of the third and fourth SRS-pos is P+P_step, and the power of the fifth and sixth SRS-pos is P+2*P_step; when the certain time range ends, in another certain time range, the transmission power is recalculated in the same manner.

In particular, the above two resource configuration methods and power configuration methods are not only applicable to differential beams based UL-AOA, but also to other UL-AOA methods;

The receiving end (take the base station equipment as an example), by differentially receiving the uplink positioning signal transmitted by the UE (using a normal beam to receive one SRS-pos, and using a differential beam to receive one identical SRS-pos); dividing the received signal value to obtain a ratio; based on the relationship between the ratio and the angle deviation, obtaining the estimated angle deviation; and based on the known beam angle, obtaining the angle estimation value of the transmitting end and the receiving end.

Preferably, in the above-mentioned DL-AOD and UL-AOA methods, the calculated ratio, the operation of obtaining the angle deviation, obtaining the angle estimation for the transmitting end and the receiving end, and/or the calculation of the positioning information of the UE finally obtained can be operated by a dedicated functional entity (location management functionality, LMF).

"User equipment" or "UE" herein can refer to any terminal with wireless communication capabilities, including but not limited to mobile phones, cellular phones, smart phones or personal digital assistants (PDAs), portable computers, image capture devices such as digital cameras, gaming device, music storage and playback device, and any portable unit or terminal with wireless communication capabilities, or Internet facilities that allow wireless Internet access and browsing. Although the foregoing embodiments of the present application are mainly described from the UE side, those skilled in the art will understand that each embodiment of the present application also includes operations on the base station side, and the base station side will perform operations corresponding to the UE side, the operations may be performed by a base station, such as base station 102 in FIG. 3B. For example, the memory 360 of the base station 102 stores computer-executable instructions. When the instructions are executed by the processor 378, at least one method corresponding to the foregoing embodiments of the present disclosure is performed.

The present disclosure also provides a computer-readable medium having computer-executable instructions stored thereon. The instructions when being executed, performs any method described in the embodiments of the present disclosure.

The description above are only preferred embodiments of this disclosure, and are not used to limit this disclosure. Any modifications, equivalent replacements, improvements, etc. made within the spirit and principles of this disclosure should be included in the scope of protection of this disclosure.

It can be understood by those skilled in the art that the present disclosure includes devices for performing one or more of the operations described in the present disclosure. These devices may be specially designed and manufactured for the desired purposes, or they may include known devices in general-purpose computers. These devices have computer programs stored therein that are selectively activated or reconstructed. Such computer programs may be stored in device (e.g., computer) readable medium, including but not limited to, any type of disk including floppy disk, hard disk, optical disk, CD-ROM, and magnetic-optical disk, Read-Only Memory (ROM), Random Access Memory (RAM), Erasable Programmable Read-Only Memory (EPROM), Electrically Erasable Programmable Read-Only Memory (EEPROM), flash memory, magnetic card or optical card. That is, readable medium includes any medium that stores or transmits information in a readable form by a device (e.g., a computer).

It can be understood by those skilled in the art that each block in these structural diagrams and/or block diagrams and/or flow diagrams and combinations of blocks in these structural diagrams and/or block diagrams and/or flow diagrams can be implemented by computer program instructions. It can be understood by those skilled in the art that these computer program instructions can be provided to processors of general-purpose computers, special-purpose computers or other programmable data processing methods for implementation, so that the schemes specified in the block or blocks of the structural diagrams and/or block diagrams and/or flow diagrams of the present disclosure can be executed by the processors of the computers or other programmable data processing methods.

Those skilled in the art can understand that steps, measures and schemes in various operations, methods and flows that have been discussed in this disclosure can be alternated, changed, combined or deleted. Further, other steps, measures and schemes in various operations, methods and flows already discussed in this disclosure can also be alternated, changed, rearranged, decomposed, combined or deleted. Furthermore, steps, measures and schemes in various operations, methods and flows disclosed in this disclosure in the prior art can also be alternated, changed, rearranged, decomposed, combined or deleted.

The description above is only part of the implementation of this disclosure, and it should be pointed out that for those skilled in the art, without departing from the principles of this disclosure, several improvements and modifications can be made, and these improvements and modifications should also be regarded as the protection scope of this disclosure.

The invention claimed is:

1. A method performed by a terminal for determining timing advance (TA) information in a wireless communication system, the method comprising:
receiving, from a first device, a first signal;
obtaining a transmission time of the first signal based on the first signal;

determining a reception time of the first signal; and
determining first TA information based on a difference value between the transmission time and the reception time.

2. The method of claim 1, further comprising:
transmitting, to the first device, a second signal based on the first TA information;
receiving, from the first device, a third signal;
obtaining TA update information based on the third signal and a moving path of the first device; and
determining second TA information based on the first TA information and the TA update information.

3. The method of claim 1, further comprising:
receiving the first signal periodically; and
updating the first TA information periodically based on the transmission time and the reception time of the first signal to obtain second TA information.

4. The method of claim 1,
wherein the first device is at least one of a base station, a satellite, a vehicle, an infrastructure, a pedestrian or another terminal, and
wherein the first signal is at least one of a primary synchronization signal (PSS), a secondary synchronization signal (SSS), a physical broadcast channel (PBCH), a synchronization signal block (SSB), a system information block (SIB), or a specific time marker signal.

5. A method performed by a first device for determining timing advance (TA) information in a wireless communication system, the method comprising:
transmitting, to a terminal, a first signal, wherein first TA information is determined based on a transmission time and a reception time of the first signal;
receiving, from the terminal, a second signal based on the first TA information; and
transmitting, to the terminal, a third signal;
wherein TA update information is determined based on the third signal and a moving path of the first device, and
wherein second TA information is determined based on the first TA information and the TA update information.

6. The method of claim 5, further comprising:
transmitting the first signal periodically,
wherein the first TA information is updated periodically based on the transmission time and the reception time of the first signal to obtain second TA information.

7. The method of claim 5,
wherein the first device is at least one of a base station, a satellite, a vehicle, an infrastructure, a pedestrian or another terminal, and
wherein the first signal is at least one of a primary synchronization signal (PSS), a secondary synchronization signal (SSS), a physical broadcast channel (PBCH), a synchronization signal block (SSB), a system information block (SIB), or a specific time marker signal.

8. A terminal for determining timing advance (TA) information in a wireless communication system, the terminal comprising:
a transceiver configured to transmit and receive a signal; and
a controller coupled with the transceiver and configured to:
receive, from a first device, a first signal,
obtain a transmission time of the first signal based on the first signal,
determine a reception time of the first signal, and
determine first TA information based on a difference value between the transmission time and the reception time.

9. The terminal of claim 8, wherein the controller is further configured to:
transmit, to the first device, a second signal based on the first TA information,
receive, from the first device, a third signal,
obtain TA update information based on the third signal and a moving path of the first device, and
determine second TA information based on the first TA information and the TA update information.

10. The terminal of claim 8, wherein the controller is further configured to:
receive the first signal periodically, and
update the first TA information periodically based on the transmission time and the reception time of the first signal to obtain second TA information.

11. The terminal of claim 8,
wherein the first device is at least one of a base station, a satellite, a vehicle, an infrastructure, a pedestrian or another terminal, and
wherein the first signal is at least one of a primary synchronization signal (PSS), a secondary synchronization signal (SSS), a physical broadcast channel (PBCH), a synchronization signal block (SSB), a system information block (SIB), or a specific time marker signal.

12. A first device for determining timing advance (TA) information, the first device comprising:
a transceiver configured to transmit and receive a signal; and
a controller coupled with the transceiver and configured to:
transmit, to a terminal, a first signal, wherein first TA information is determined based on a transmission time and a reception time of the first signal,
receive, from the terminal, a second signal based on the first TA information, and
transmit, to the terminal, a third signal,
wherein TA update information is determined based on the third signal and a moving path of the first device, and
wherein second TA information is determined based on the first TA information and the TA update information.

13. The first device of claim 12,
wherein the controller is further configured to transmit the first signal periodically, and
wherein the first TA information is updated periodically based on the transmission time and the reception time of the first signal to obtain second TA information.

14. The first device of claim 12,
wherein the first device is at least one of a base station, a satellite, a vehicle, an infrastructure, a pedestrian or another terminal.

15. The first device of claim 12,
wherein the first signal is at least one of a primary synchronization signal (PSS), a secondary synchronization signal (SSS), a physical broadcast channel (PBCH), a synchronization signal block (SSB), a system information block (SIB), or a specific time marker signal.

* * * * *